United States Patent
Noh et al.

(10) Patent No.: US 8,953,642 B2
(45) Date of Patent: Feb. 10, 2015

(54) METHOD AND APPARATUS FOR TRANSMITTING A DOWNLINK REFERENCE SIGNAL IN A WIRELESS COMMUNICATION SYSTEM SUPPORTING MULTIPLE ANTENNAS

(75) Inventors: Yu Jin Noh, Anyang-si (KR); Dong Wook Roh, Anyang-si (KR); Joon Kui Ahn, Anyang-si (KR); Byeong Woo Kang, Anyang-si (KR); Dae Won Lee, Anyang-si (KR); Bong Hoe Kim, Anyang-si (KR); Eun Sun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 268 days.

(21) Appl. No.: 13/391,222

(22) PCT Filed: Sep. 15, 2010

(86) PCT No.: PCT/KR2010/006299
§ 371 (c)(1),
(2), (4) Date: Feb. 17, 2012

(87) PCT Pub. No.: WO2011/034340
PCT Pub. Date: Mar. 24, 2011

(65) Prior Publication Data
US 2012/0155414 A1    Jun. 21, 2012

Related U.S. Application Data

(60) Provisional application No. 61/242,763, filed on Sep. 15, 2009.

(30) Foreign Application Priority Data

Sep. 15, 2010 (KR) .................... 10-2010-0090462

(51) Int. Cl.
*H04J 1/00* (2006.01)
*H04L 5/00* (2006.01)
(Continued)

(52) U.S. Cl.
CPC ............ *H04L 5/0023* (2013.01); *H04B 7/0417* (2013.01); *H04L 1/0026* (2013.01);
(Continued)

(58) Field of Classification Search
CPC .. H04B 7/0417; H04B 7/0626; H04B 7/0632; H04L 1/0026; H04L 5/0023; H04L 5/0048; H04L 5/0053; H04L 5/0035; H04W 24/10; H04W 72/04

USPC ........ 370/208, 310–350, 436, 441, 479, 480, 370/482, 485
See application file for complete search history.

(56) References Cited

U.S. PATENT DOCUMENTS

| | | | |
|---|---|---|---|
| 7,406,337 | B2 | 7/2008 | Kim et al. |
| 2009/0180435 | A1 * | 7/2009 | Sarkar .......................... 370/330 |

(Continued)

FOREIGN PATENT DOCUMENTS

| | | |
|---|---|---|
| KR | 10-2004-0074340 A | 8/2004 |
| KR | 10-2008-0069753 A | 7/2008 |

(Continued)

OTHER PUBLICATIONS

Huawei, "Consideration on CSI-RS Design for CoMP and Text Proposal to 36.814", 3GPP TSG RAN WG1 meeting #58, R1-093031, Aug. 24-28, 8 pages.

(Continued)

*Primary Examiner* — Ricky Ngo
*Assistant Examiner* — Wei-Po Kao
(74) *Attorney, Agent, or Firm* — Birch, Stewart, Kolasch & Birch, LLP

(57) ABSTRACT

The present invention relates to a wireless communication system, and more particularly, to a method and apparatus for transmitting a downlink reference signal in a wireless communication system that supports multiple antennas. A method for transmitting channel state information-reference signals (CSI-RS) for two or more antenna ports according to one embodiment of the present invention comprises the steps of: mapping the CSI-RSs for the two or more antenna ports in predetermined patterns on a data region of a downlink subframe: an transmitting the downlink subframe mapped with the CSI-RSs for the two or more antenna ports, wherein the predetermined patterns are defined as patterns differing by a cell, and the different patterns may be defined as the predetermined patterns being shifted in a temporal range, frequency range, or a temporal range and a frequency range.

12 Claims, 36 Drawing Sheets

(51) Int. Cl.
*H04B 7/04* (2006.01)
*H04L 1/00* (2006.01)
*H04L 5/14* (2006.01)
*H04L 25/02* (2006.01)
*H04L 25/03* (2006.01)

(52) U.S. Cl.
CPC ............ *H04L5/0048* (2013.01); *H04L 5/0053* (2013.01); *H04L 5/0057* (2013.01); *H04L 5/1469* (2013.01); *H04L 5/0082* (2013.01); *H04L 25/0226* (2013.01); *H04L 2025/03426* (2013.01); *H04L 2025/03802* (2013.01); *H04L 5/0035* (2013.01); *H04L 5/0073* (2013.01)
USPC ........... 370/482; 370/208; 370/344; 370/436; 370/479; 370/480; 370/485

(56) References Cited

U.S. PATENT DOCUMENTS

2010/0246376 A1* 9/2010 Nam et al. .................... 370/208
2010/0303016 A1* 12/2010 Jin et al. ........................ 370/328
2011/0080968 A1   4/2011 Seo et al.
2011/0205954 A1*  8/2011 Gorokhov et al. ............ 370/315
2012/0250608 A1* 10/2012 Wang et al. ................... 370/328

FOREIGN PATENT DOCUMENTS

KR    10-2008-0077899 A    8/2008
KR    10-2009-0017963 A    2/2009

OTHER PUBLICATIONS

NEC Group, "CQI-RS for LTE-Advanced", 3GPP TSG-RAN WG1 Meeting #56bis, R1-091221, Mar. 23-27, 2009, 6 pages.

Qualcomm Europe, "RS Structure in Support of Higher-order MIMO", 3GPP TSG-RAN WG1 #bis, R1-091450, Mar. 23-27, 2009, pp. 1-11.

Samsung, "Discussions on CSI-RS for LTE-Advanced", 3GPP TSG RAN WG1 #57, R1-092204, May 4-9, 2009, 7 pages.

* cited by examiner (a)

(b)

(a)

(b)

(a)

(b)

▨ PDCCH  ▦ low transmission rank DMRS
▨ CRS  ▥ high transmission rank DMRS
≡ relay subframe guard time  ▒ resource element affected by power boosting of CRS

- PDCCH
- CRS
- relay subframe guard time
- low transmission rank DMRS
- high transmission rank DMRS
- resource element affected by power boosting of CRS (a)

(b)

(c)

(d)

- PDCCH
- CRS
- relay subframe guard time
- resource element unused for DL transmission
- low transmission rank DMRS
- high transmission rank DMRS
- resource element affected by power boosting of CRS (a)

(b)

| | PDCCH | | low transmission rank DMRS |
| | CRS | | high transmission rank DMRS |
| | relay subframe guard time | | resource element affected by power boosting of CRS |
| | resource element unused for DL transmission | | |

| 0 | CSI-RS for antenna port 0 |
| 1 | CSI-RS for antenna port 1 |
| 2 | CSI-RS for antenna port 2 |
| 3 | CSI-RS for antenna port 3 |

- PDCCH
- CRS
- relay subframe guard time
- resource element unused for DL transmission
- low transmission rank DMRS
- high transmission rank DMRS
- resource element affected by power boosting of CRS

| | |
|---|---|
| ▨ PDCCH | ▦ low transmission rank DMRS |
| ▨ CRS | ▥ high transmission rank DMRS |
| ≡ relay subframe guard time | ▨ resource element affected by power boosting of CRS |
| ▩ resource element unused for DL transmission | |

| 0 | CSI-RS for antenna port 0
| 1 | CSI-RS for antenna port 1
| 2 | CSI-RS for antenna port 2
| 3 | CSI-RS for antenna port 3

(a)

(b)

- PDCCH
- CRS
- relay subframe guard time
- resource element unused for DL transmission
- low transmission rank DMRS
- high transmission rank DMRS
- resource element affected by power boosting of CRS
- [0] CSI-RS for antenna port 0
- [1] CSI-RS for antenna port 1
- [2] CSI-RS for antenna port 2
- [3] CSI-RS for antenna port 3

METHOD AND APPARATUS FOR TRANSMITTING A DOWNLINK REFERENCE SIGNAL IN A WIRELESS COMMUNICATION SYSTEM SUPPORTING MULTIPLE ANTENNAS

This application is the National Phase of PCT/KR2010/006299 filed on Sep. 15, 2010, which claims priority under 35 U.S.C. 119(e) to U.S. Provisional Application No. 61/242,763 filed on Sep. 15, 2009 and under 35 U.S.C. 119(a) to Patent Application No. 10-2010-0090462 filed in the Republic of Korea on Sep. 15, 2010, all of which are hereby expressly incorporated by reference into the present application.

TECHNICAL FIELD

The present invention relates to a wireless communication system, and more particularly, to a method and apparatus for transmitting a downlink reference signal in a multi-carrier supporting wireless communication system.

BACKGROUND ART

MIMO (multiple input multiple output) system means the system that improvise transmission/reception efficiency of data using multiple transmitting antennas and multiple receiving antennas. The MIMO technology may be categorized into a spatial diversity scheme and a spatial multiplexing scheme. Since the spatial diversity scheme raises transmission reliability or widens a cell radius through diversity gain, it is suitable for data transmission to a user equipment that moves at high speed. The spatial multiplexing scheme transmits different data simultaneously, thereby raising a data transmission rate without increasing a bandwidth of system.

In MIMO system, each transmitting antenna has an independent data channel. A transmitting antenna may mean a virtual antenna or a physical antenna. A receiver receives data transmitted from each transmitting antenna in a manner of estimating a channel for the corresponding transmitting antenna. Channel estimation means a process for reconstructing a received signal by compensating for distortion of a signal caused by fading. In this case, the fading indicates an effect that strength of a signal rapidly fluctuates due to multipath-time delay in a wireless communication system environment. For the channel estimation, a reference signal known to both a transmitter and a receiver is necessary. The reference signal may be simply named RS or a pilot in accordance with an applicable standard.

Downlink reference signal is a pilot signal for coherent demodulation of such a channel as PDSCH (Physical Downlink Shared CHannel), PCFICH (Physical Control Format Indicator CHannel), PHICH (Physical Hybrid Indicator CHannel), PDCCH (Physical Downlink Control CHannel) and the like. The downlink reference signal may be categorized into a common reference signal (CRS) shared by al user equipments in a cell and a dedicated reference signal (DRS) for a specific user equipment only. The common reference signal may be called a cell-specific reference signal. And, the dedicated reference signal may be called a user equipment-specific (UE-specific) reference signal or a demodulation reference signal (DMRS).

In a system having an antenna configuration (e.g., system according to LTE-A standard capable of supporting 8 transmitting antenna) extended more than that of a conventional communication system (e.g., system according to LTE Release 8 or 9 standard) capable of supporting 4 transmitting antennas, a transmission of a reference signal (i.e., CSI-RS) for a receiving side to acquire channel state information (CSI) is requested.

DISCLOSURE OF THE INVENTION

Technical Task

The technical task of the present invention is to provide a method of transmitting a downlink reference signal efficiently in accordance with a type of a subframe in MIMO transmission, a method of transmitting a downlink reference signal efficiently in MIMO transmission by differentiating a pattern of the downlink reference signal for each cell, and a method of transmitting a downlink reference signal in MIMO transmission in case of a special subframe, and the like.

Technical Solutions

To achieve these and other advantages and in accordance with the purpose of the present invention, as embodied and broadly described, a method of transmitting channel state information-reference signals (CSI-RSs) for at least 2 antenna ports, comprising the steps of: mapping the CSI-RSs for the at least 2 antenna ports to a data region of a downlink subframe in accordance with a prescribed pattern; and transmitting the downlink subframe to which the CSI-RSs for the at least 2 antenna ports are mapped, wherein the prescribed pattern is defined as a pattern different per cell, and wherein the different pattern is defined as a pattern shifted from the prescribed pattern in one of a time domain, a frequency domain or time-and-frequency domains.

Preferably, the prescribed pattern defines that the CSI-RSs for one cell are arranged on a portion of OFDM symbols on which a demodulation reference signals (DMRSs) are arranged.

Preferably, the prescribed pattern may define that the CSI-RSs for one cell are arranged on 2 OFDM symbols in one resource block.

To further achieve these and other advantages and in accordance with the purpose of the present invention, a method of transmitting channel state information-reference signals (CSI-RSs for at least 2 antenna ports, according to another embodiment of the present invention may include the steps of mapping the CSI-RSs for the at least 2 antenna ports to a data region of a downlink subframe in accordance with a prescribed pattern and transmitting the downlink subframe to which the CSI-RSs for the at least 2 antenna ports are mapped, wherein the prescribed pattern is defined as a pattern different in accordance with a type of the downlink subframe and wherein the different pattern is defined as a pattern shifted from the prescribed pattern in one of a time domain, a frequency domain or time-and-frequency domains.

Preferably, a type of the downlink subframe may be categorized into a downlink subframe having a normal cyclic prefix (CP) configuration and a downlink subframe having an extended cyclic prefix (CP) configuration.

Preferably, a type of the downlink subframe may be categorized into a special subframe including DwPTS (downlink pilot time slot) and a normal subframe not including the DwPTS.

More preferably, if the downlink subframe is the special subframe including the DwPTS, the prescribed pattern may define that the CSI-RSs for the at least 2 antenna ports are arranged only in a first slot of the downlink subframe.

To further achieve these and other advantages and in accordance with the purpose of the present invention, a method of measuring a channel from channel state information-reference signals (CSI-RSs) for at least 2 antenna ports, according to another embodiment of the present invention may the steps of receiving a downlink subframe in which the CSI-RSs for the at least 2 antenna ports are mapped to a data region of a downlink subframe in accordance with a prescribed pattern and measuring a channel for each of the antenna ports using the CSI-RSs for the at least 2 antenna ports, wherein the prescribed pattern is defined as a pattern different per cell and wherein the different pattern is defined as a pattern shifted from the prescribed pattern in one of a time domain, a frequency domain or time-and-frequency domains.

Preferably, the prescribed pattern defines that the CSI-RSs for one cell are arranged on a portion of OFDM symbols on which a demodulation reference signals (DMRSs) are arranged.

Preferably, the prescribed pattern defines that the CSI-RSs for one cell may be arranged on 2 OFDM symbols in one resource block.

To further achieve these and other advantages and in accordance with the purpose of the present invention, a method of measuring channel from channel state information-reference signals (CSI-RSs) for at least 2 antenna ports, according to another embodiment of the present invention may include the steps of receiving a downlink subframe in which the CSI-RSs for the at least 2 antenna ports are mapped to a data region of a downlink subframe in accordance with a prescribed pattern and measuring a channel for each of the antenna ports using the CSI-RSs for the at least 2 antenna ports, wherein the prescribed pattern is defined as a pattern different in accordance with a type of the downlink subframe and wherein the different pattern is defined as a pattern shifted from the prescribed pattern in one of a time domain, a frequency domain or time-and-frequency domains.

Preferably, a type of the downlink subframe may be categorized into a downlink subframe having a normal cyclic prefix (CP) configuration and a downlink subframe having an extended cyclic prefix (CP) configuration.

Preferably, a type of the downlink subframe may be categorized into a special subframe including DwPTS (downlink pilot time slot) and a normal subframe not including the DwPTS.

More preferably, if the downlink subframe is the special subframe including the DwPTS, the prescribed pattern may define that the CSI-RSs for the at least 2 antenna ports are arranged only in a first slot of the downlink subframe.

To further achieve these and other advantages and in accordance with the purpose of the present invention, a base station for transmitting channel state information-reference signals (CSI-RSs) for at least 2 antenna ports, according to another embodiment of the present invention may include a receiving module receiving an uplink signal from a user equipment, a transmitting module transmitting a downlink signal to the user equipment, and a processor controlling the base station including the receiving module and the transmitting module, the processor mapping the CSI-RSs for the at least 2 antenna ports to a data region of a downlink subframe in accordance with a prescribed pattern, the processor controlling the transmitting module to transmit the downlink subframe to which the CSI-RSs for the at least 2 antenna ports are mapped, wherein the prescribed pattern is defined as a pattern different per cell and wherein the different pattern is defined as a pattern shifted from the prescribed pattern in one of a time domain, a frequency domain or time-and-frequency domains.

To further achieve these and other advantages and in accordance with the purpose of the present invention, a user equipment for measuring channel from channel state information-reference signals (CSI-RSs) for at least 2 antenna ports, according to a further embodiment of the present invention may include a receiving module receiving a downlink signal from a base station, a transmitting module transmitting an uplink signal to the base station, and a processor controlling the user equipment including the receiving module and the transmitting module, the processor controlling the receiving module to receive a downlink subframe in which the CSI-RSs for the at least 2 antenna ports are mapped to a data region of a downlink subframe in accordance with a prescribed pattern, the processor configured to measure a channel for each of the antenna ports using the CSI-RSs for the at least 2 antenna ports, wherein the prescribed pattern is defined as a pattern different per cell and wherein the different pattern is defined as a pattern shifted from the prescribed pattern in one of a time domain, a frequency domain or time-and-frequency domains.

The above-mentioned general description of the present invention and the following details of the present invention are exemplary and may be provided for the additional description of the invention disclosed in claims.

Advantageous Effects

According to the above-mentioned embodiments of the present invention, provided as a method and apparatus for transmitting a downlink reference signal efficiently in accordance with a type of a subframe, a method and apparatus for transmitting a downlink reference signal efficiently by differentiating a pattern of the downlink reference signal for each cell, and a method and apparatus for transmitting a downlink reference signal in MIMO transmission in case of a special subframe.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Figure 1:
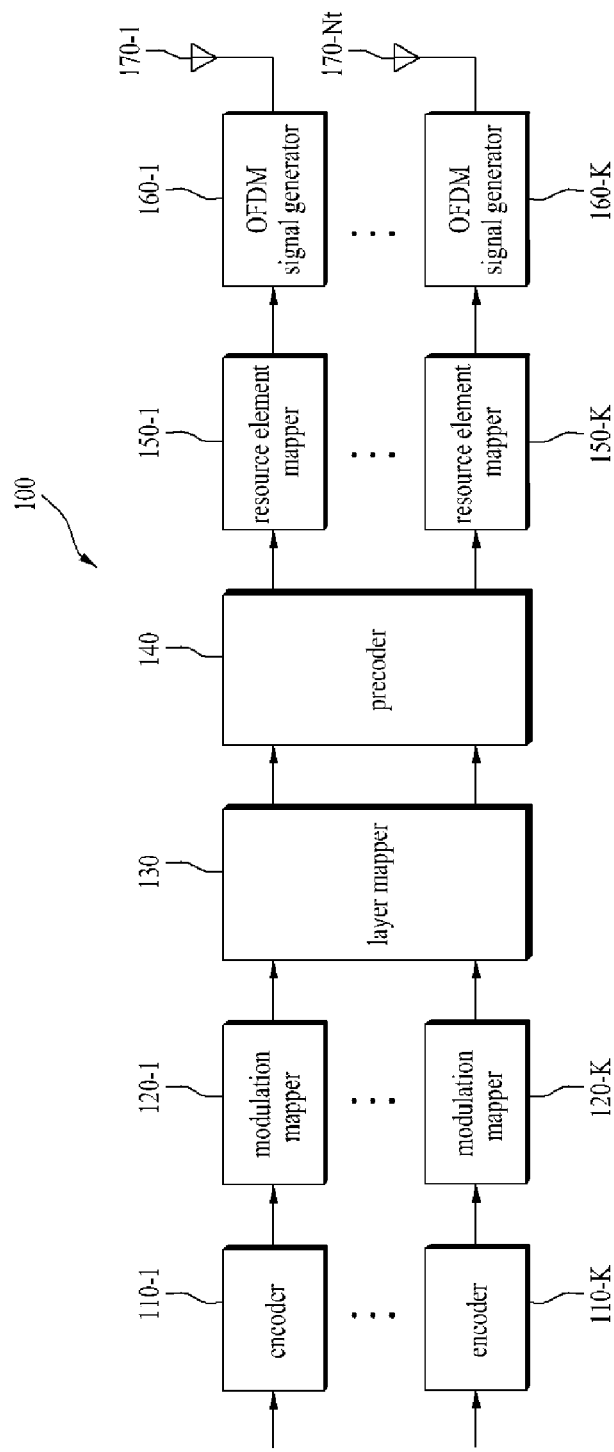
FIG. 1 is a block diagram for a structure of a transmitter including multiple antennas.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this disclosure, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

In the following description, 'rank' in MIMO transmission indicates the number of paths for transmitting signals independently and 'number of layer(s)' may indicate the number of signal stream(s) transmitted via each path. Since a transmitting stage transmits layer amounting to the number of ranks used for signal transmission, a rank may have the same meaning of the number of layers unless mentioned especially.

FIG. 1 is a block diagram for a structure of a transmitter including multiple antennas.

Referring to FIG. 1, a transmitter 100 encoders 110-1 to 110-K, modulation mappers 120-1 to 120-K, a layer mappers 130, a precoder 140, resource element mappers 150-1 to 150-K, and OFDM signal generators 160-1 to 160-K. And, the transmitter 100 includes Nt transmitting antennas 170-1 to 170-Nt.

Each of the encoders 110-1 to 110-K encodes an inputted data by a predetermined coding scheme and then generates a coded data. Each of the modulation mappers 120-1 to 120-K maps the coded data to a modulation symbol that represents a position on a signal constellation. No limitation is put on a modulation scheme. And, the modulation scheme may include m-PSK (m-phase shift keying) or m-QAM (m-quadrature amplitude modulation). For instance, the m-PSK may include one of BPSK, QPSK and 8-PSK. For instance, the m-QAM may include one of 16-QAM, 64-QAM and 256-QAM.

The layer mapper 130 defines a layer of a modulation symbol to enable the precoder 140 to distribute an antenna-specific symbol to the path of each of the antennas. In this case, the layer is defined as an information path inputted to the precoder 140. And, the information path before the precoder 140 may be called a virtual antenna or a layer.

The precoder 140 outputs an antenna-specific symbol by processing the modulation symbol by MIMO scheme according to the multiple transmitting antennas 170-1 to 170-Nt. The precoder 140 distributes a specific symbol to each of the resource element mappers 150-1 to 150-K on the path of the corresponding antenna. Each information path sent by the precoder 140 to one antenna may be called a stream. This may be regarded as a physical antenna.

Each of the resource element mappers 150-1 to 150-K allocates the antenna-specific symbol to a proper resource element and multiplexes it in accordance with a user. Each of the OFDM signal generators 160-1 to 160-K outputs OFDM symbol by modulating the antenna-specific symbol by OFDM scheme. Each of the OFDM signal generators 160-1 to 160-K may be able to perform IFFT (inverse fast Fourier transform) on the antenna-specific symbol. And, a cyclic prefix (CP) may be inserted in a time-domain symbol on which IFFT is performed. The CP is the signal inserted in a guard interval to remove inter-symbol interference due to the multiple paths in OFDM transmission scheme. And, OFDM symbol is transmitted via each of the transmitting antenna 170-1 to 170-Nt.

Downlink (DL) radio frame structures are described with reference to FIG. 2 and FIG. 3 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

Figure 2:
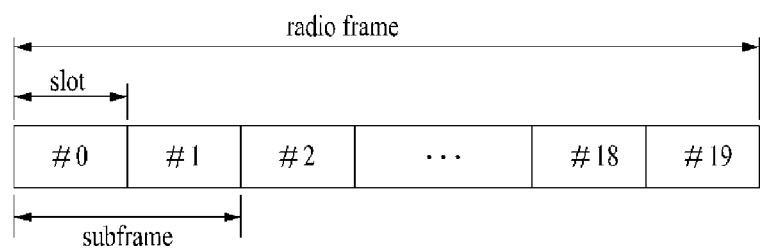
FIG. 2 is a diagram for a structure of a downlink radio frame of type 1.

FIG. 2 is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

Figure 3:
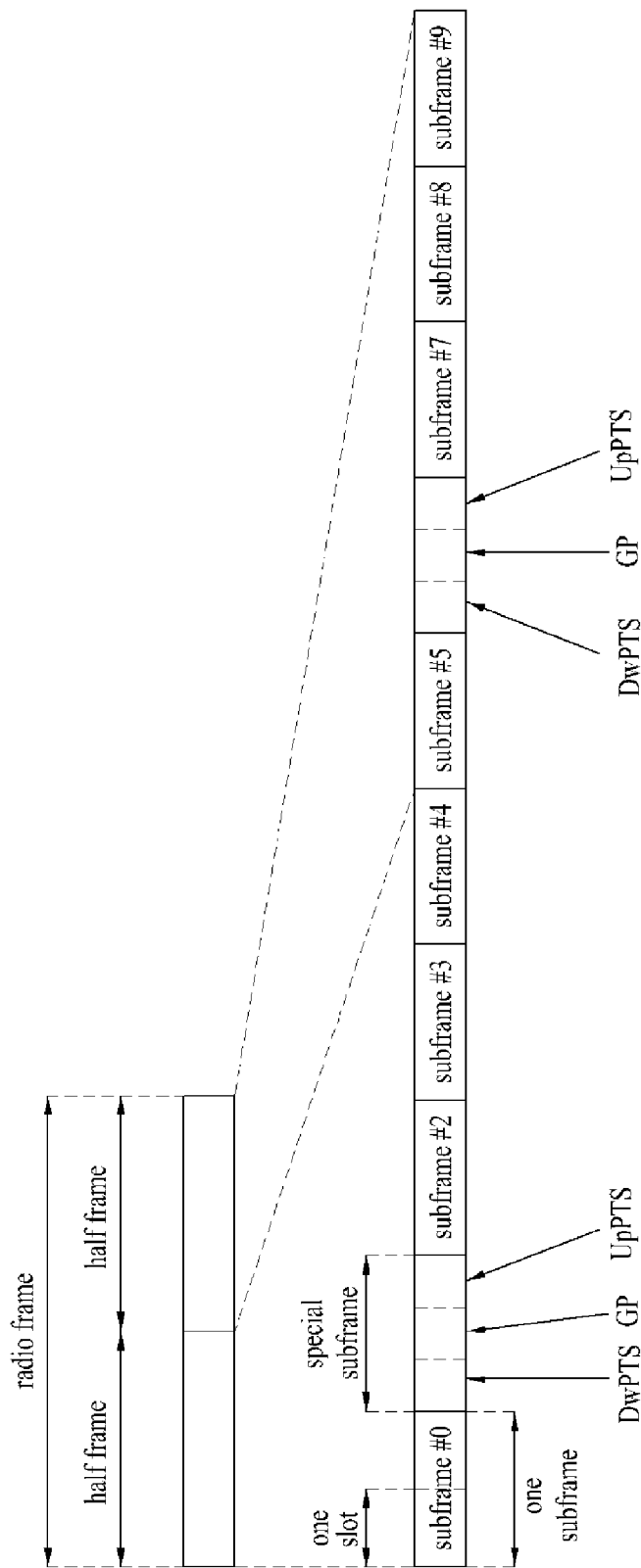
FIG. 3 is a diagram for a structure of a downlink radio frame of type 2.

FIG. 3 is a diagram for a structure of a downlink radio frame of type 2. A type-2 radio frame includes 2 half frames. Each of the half frame includes 5 subframes. The Subframes may be categorized into a general subframe and a special subframe. The special frame is the subframe that includes 3 fields of DwPTS (downlink pilot time slot), GP (gap period) and UpPTS (uplink pilot time slot). Although lengths of the 3 fields may be individually settable, the total length of the 3 fields should be set to 1 ms. One subframe includes 2 slots. In particular, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 4:
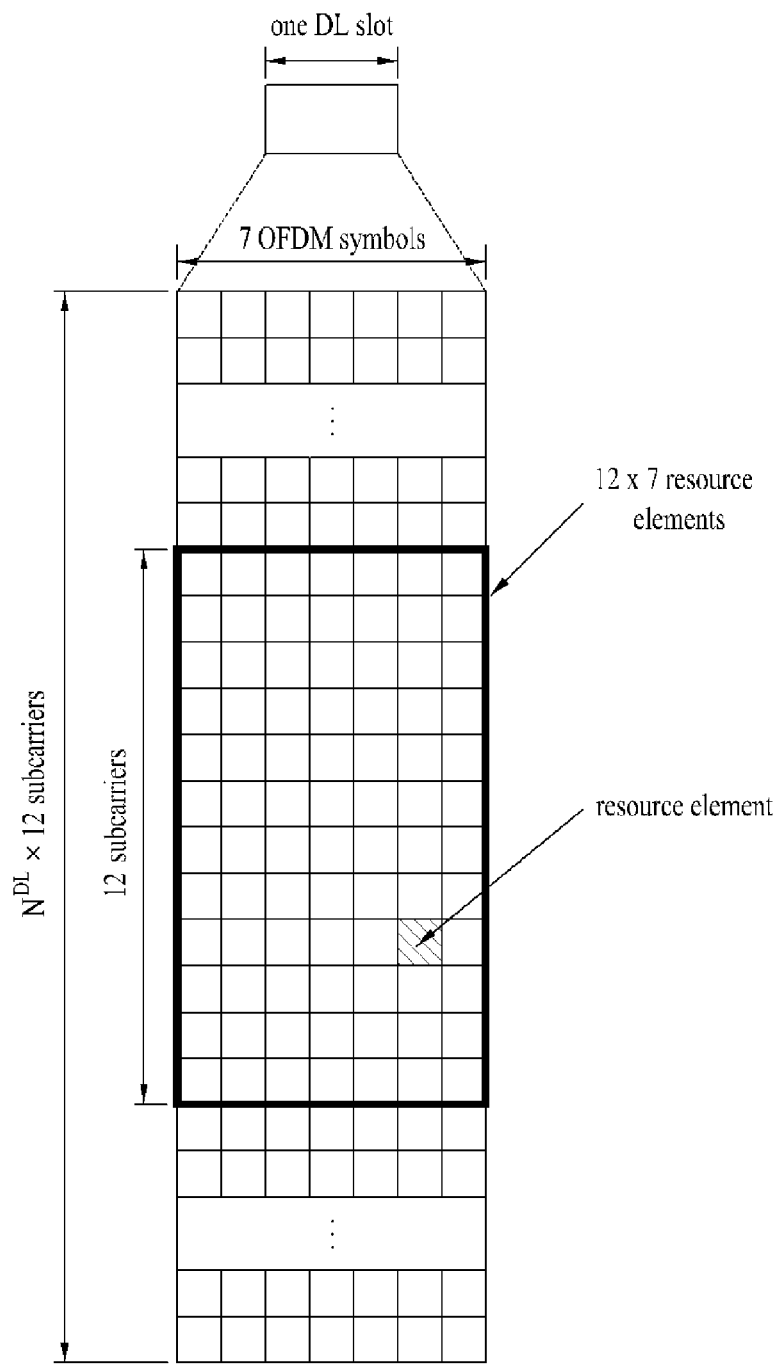
FIG. 4 is a diagram for one example of a resource grid in a downlink slot.

FIG. 4 is a diagram for one example of a resource grid for a downlink (DL) slot. This shows the case that OFDM symbol includes a normal CP. Referring to FIG. 4, a DL slot includes a plurality of OFDM symbols in time domain and a plurality of resource blocks (RBs) in frequency domain. In this case, one DL slot may include 7 OFDM symbols and one resource block (RB) may include 12 subcarriers, by which the present invention may be non-limited. Each element on a resource grid may be named a resource element (hereinafter abbreviated RE). For instance, a resource element a (k, l) becomes a resource element situated at $k^{th}$ subcarrier and $l^{st}$ OFDM symbol. In case of a normal CP, one resource block includes 12×7 resource elements (cf. 12×6 resource elements included in case of an extended CP). Since an interval of each subcarrier is 15 kHz, one resource block may include about 180 kHz in frequency domain. $N^{DL}$ indicates the number of resource blocks included in a DL slot. And, the value of the $N^{DL}$ may depend on a DL transmission bandwidth set by the scheduling of a base station.

Figure 5:
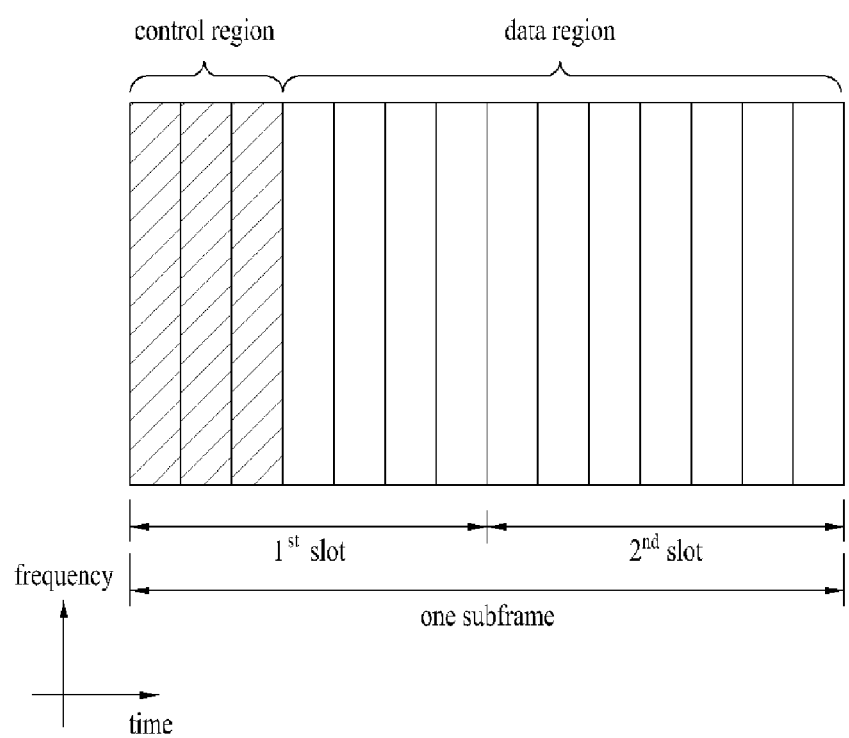
FIG. 5 is a diagram for a structure of a downlink subframe.

FIG. 5 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such an upper layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 6:
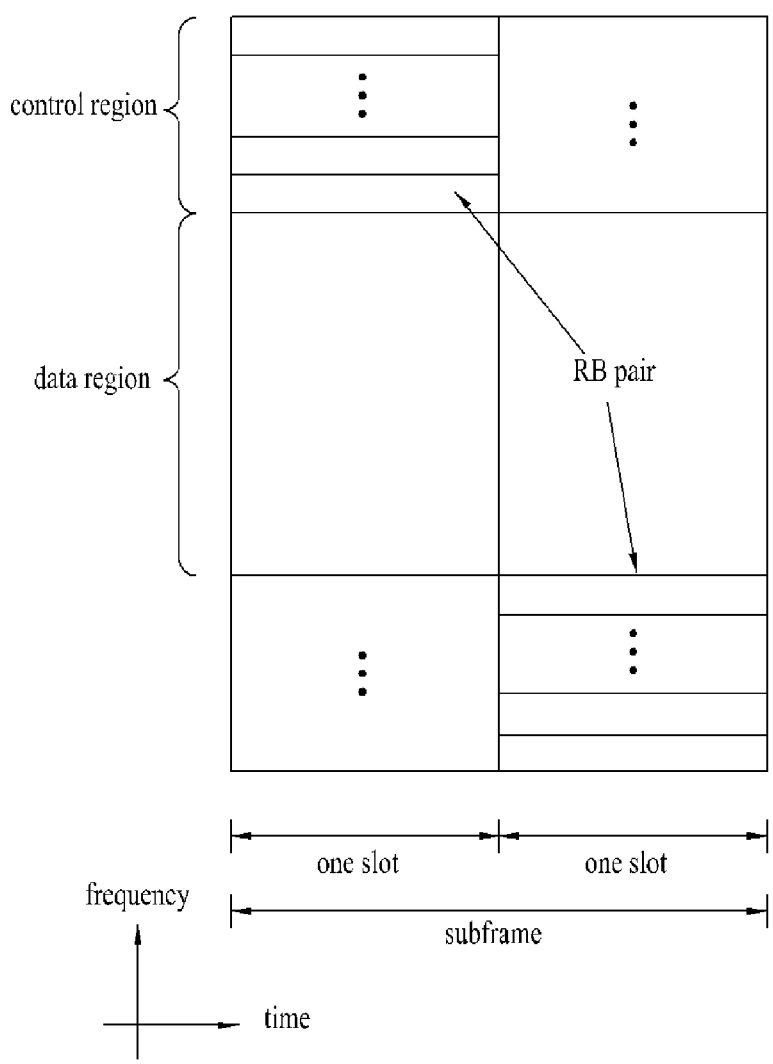
FIG. 6 is a diagram for an uplink subframe.

FIG. 6 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Modeling of Multi-Antenna (MIMO) System

Figure 7:
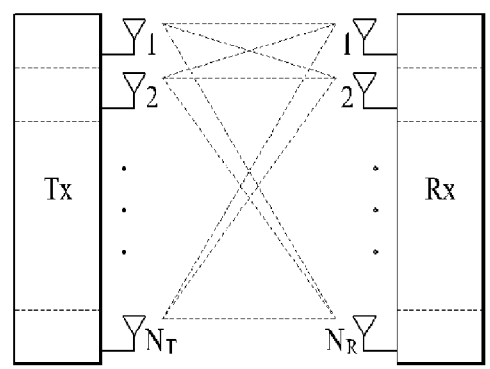
FIG. 7 is a diagram for a configuration of a wireless communication system including multiple antennas.
Figure 7:
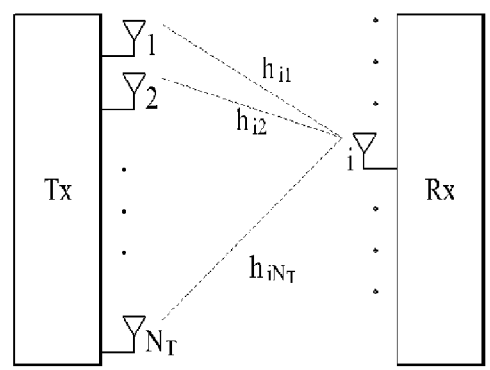

FIG. 7 is a diagram for a configuration of a wireless communication system including multiple antennas. Referring to FIG. 7 (a), if the number of transmitting antennas is incremented into $N_T$ and the number of receiving antennas is incremented into $N_R$, theoretical channel transmission capacity is increased in proportion to the number of antennas unlike the case that a transmitter or receiver uses a plurality of antennas. Hence, a transmission rate may be enhanced and frequency efficiency may be remarkably raised. The transmission rate according to the increase of the channel transmission capacity may be theoretically raised by an amount resulting from multiplying a maximum transmission rate $R_0$ of the case of using a single antenna by a rate increasing rate $R_i$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many efforts are ongoing to be made to various techniques for drive it into substantial data rate improvement. Some of theses techniques are already adopted as standards for various wireless communications such as 3G mobile communications, a next generation wireless LAN and the like.

The trends for the MIMO relevant studies are explained as follows. First of all, many efforts are ongoing to be made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Assume that $N_T$ transmitting antennas and $N_R$ receiving antennas exist in this system.

First of all, a transmission signal is explained. If there are $N_T$ transmitting antennas, $N_T$ maximum transmittable informations exist. Hence, the transmission information may be represented as follows.

$$s = [s_1, s_2, \ldots, s_{N_T}]^T \quad \text{[Formula 2]}$$

Meanwhile, transmission power can be set different for each transmission information $s_1, s_2, \ldots, s_{N_T}$. If the respective transmission powers are set to $P_1, P_2, \ldots, P_{N_T}$, the transmission power adjusted transmission information may be represented as follows.

$$\hat{s}[\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, $\hat{S}$ may be represented as follows using a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

If a weight matrix W is applied to the transmission power adjusted transmission information vector $\hat{S}$, a case of configuring $N_T$ transmission signals $x_1, x_2, \ldots, x_{N_T}$ actually transmitted can be taken into consideration as follows. In this case, the weight matrix W plays a role in properly distributing each transmission information to each antenna according to a transmission channel status and the like. The $x_1, x_2, \ldots, x_{N_T}$ may be represented as followings using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

In Formula 5, $w_{ij}$ indicates a weight between an $i^{th}$ transmitting antenna and a $j^{th}$ information. And, W may be called a precoding matrix.

When $N_R$ receiving antennas exist, if reception signals of the receiving antennas are set to $y_1, y_2, \ldots, y_{N_R}$, a reception signal vector can be represented as follows.

$$y = [y_1, y_2, \ldots, y_{N_R}]^T \quad \text{[Formula 6]}$$

If a channel is modeled in MIMO wireless communication system, the channel can be represented as an index of a transmitting antenna and an index of a receiving antenna. A channel between a transmitting antenna j and a receiving antenna i may be represented as $h_{ij}$. In the $h_{ij}$, it should be noted that a receiving antenna index is followed by a transmitting antenna index in order of index.

FIG. 7 (b) shows a channel to a receiving antenna i from each of $N_T$ transmitting antennas. These channels may be represented as a vector or matrix in a manner of tying the channels b together. Referring to FIG. 7 (b), the channels between the receiving antenna i and the $N_T$ transmitting antennas can be represented as follows.

$$h_i^T = [h_{i1}, h_{i2}, \ldots, h_{iN_T}] \quad \text{[Formula 7]}$$

Hence, al the channels arriving from $N_T$ transmitting antennas to $N_R$ relieving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Formula 8]

In an actual channel, a transmission signal passes through a channel matrix H and then has AWGN (additive white Gaussian noise) added thereto. If white noses $n_1, n_2, \ldots, n_{N_R}$ respectively added to $N_R$ receiving antennas, the white noises $n_1, n_2, \ldots, n_{N_R}$ can be represented as follows.

$$n = [n_1, n_2, \ldots, n_{N_R}]^T$$ [Formula 9]

Hence, the reception signal vector may be expressed as follows through the above-mentioned formula modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Formual 10]

$$Hx + n$$

The above description mainly relates to a case that the MIMO communication system is used by a single user. Yet, it may be possible to obtain multiuser diversity in a manner of applying the MIMO communication system to a plurality of users. This may be described in brief as follows.

First of all, a fading channel is a well-known major factor for brining performance degradation of a wireless communication system. A channel gain varies in accordance with time, frequency and space. The lower the channel gain value gets, the more serious the performance degradation becomes. Diversity is one of the methods for overcoming the fading. And, the diversity uses a fact that the probability for all of several independent channels to have low gains respectively is very low. Various diversity schemes are available and multiuser diversity corresponds to one of them.

When several users are present in a cell, since a channel gain of each of the users is probabilistically independent, the probability for all of the users to have low gains respectively is very low. According to information theory, assuming that transmission power of a base station is sufficient, when several users are present in a cell, if a channel is fully assigned to the user having a highest channel gain, it may be able to maximize total capacity of the channel. The multiuser diversity may be categorized into 3 types as follows.

Multiuser temporal diversity is a scheme of assigning a channel to a user having a highest gain value each time a channel varies in accordance with time. Multiuser frequency diversity is a scheme of allocating a subcarrier to a user having a maximum gain on each frequency band in such a frequency multi-carrier system as OFDM (orthogonal frequency division multiplexing).

If a channel varies very slow in a system that does not use multi-carrier, a user having a highest channel gain may monopolize a channel for considerable duration. Hence, other users may not be able to perform communications. In this case, it may be necessary to lead a channel variation in order to use the multiuser diversity.

Multiuser spatial diversity is a scheme of using a fact that channel gains of users differ in accordance with space in general. For example of the multiuser spatial diversity, there is RBF (random beamforming) or the like. The RBF may be called 'opportunistic beamforming' and corresponds to the scheme of leading a channel variation in a manner that a transmitting stage performs beamforming with a random weight using MIMO.

Multiuser MIMO (hereinafter abbreviated MU-MIMO) system of using the above-described multiuser diversity for the MIMO system is described as follows.

First of all, in the multiuser MIMO system, various kinds of combinations of the number of users and the number of antennas of each of the users are possible in a transmitting/receiving stage. The multiuser MIMO system may be explained in aspect of downlink (or forward link) and uplink (or reverse link). In this case, the downlink may mean the case that a base station transmits signals to a plurality of user equipments. And, the uplink may mean the case that a plurality of user equipments transmit signals to a base station.

In case of the downlink, for extreme example, one user may be able to receive a signal via total $N_R$ antennas. For another extreme example, each of total $N_R$ users may be able to receive a signal using one antenna. And, an intermediate combination of the two extreme examples may be possible. In particular, for example of the intermediate combination, a prescribed user uses one receiving antenna, whereas another prescribed user uses 3 receiving antennas. Yet, it should be noted that a total sum of the number of receiving antennas is constantly maintained as $N_R$ in any case of the combinations. This case may be called MIMO BC (broadcast channel) or SDMA (space division multiple access) in general.

In case of the uplink, for extreme example, one user may be able to transmit a signal via total $N_T$ antennas. For another extreme example, each of total $N_R$ users may be able to transmit a signal using one antenna. And, an intermediate combination of the two extreme examples may be possible. In particular, for example of the intermediate combination, a prescribed user uses one transmitting antenna, whereas another prescribed user uses 3 transmitting antennas. Yet, it should be noted that a total sum of the number of transmitting antennas is constantly maintained as $N_T$ in any case of the combinations. This case may be called MIMO MAC (multiple access channel) in general. Since the uplink and the downlink are symmetric to each other, a scheme used by one side may be available for the other side.

Meanwhile, the number of rows/columns of a channel matrix H indicating a channel state is dependent on the number of transmitting/receiving antennas. The number of rows in the channel matrix H is equal to the number $N_R$ of the receiving antennas. The number of columns in the channel matrix H is equal to the number $N_T$ of the transmitting antennas. In particular, the channel matrix H becomes $N_R \times N_T$ matrix.

A rank of matrix is defined as a minimum one of the number of independent rows and the number of independent columns. Hence, it may be impossible for a rank of matrix to become greater than the number of rows or columns. A rank (rank(H)) of a channel matrix H is restricted to the following.

$$Rank(H) \leq \min(N_T, N_R)$$ [Formula 11]

For another definition of a rank, when Eigen value decomposition is performed on a matrix, a rank may be defined as the number of Eigen values except 0. Similarly, for a further definition of a rank, when singular value decomposition is performed, a rank may be defined as the number of singular values except 0. Hence, the physical meaning of a rank in a channel matrix may be regarded as a maximum number for sending different informations on a given channel.

Reference Signal (RS)

When a packet is transmitted in a wireless communication system, since the transmitted packet is transmitted on a radio channel, signal distortion may occur in the course of the transmission. In order for a receiving side to correctly receive the distorted signal, distortion in a received signal should be corrected using channel information. In order to acquire the channel information, after a signal known to both a receiving side and a transmitting side has been transmitted, the channel information can be acquired with a degree of distortion on receiving the signal on a channel. This signal may be called a pilot signal or a reference signal.

In case of transmitting or receiving data using MIMO, a channel status between each transmitting antenna and each receiving antenna should be obtained to receive a correct signal. Hence, a separate reference signal needs to be present for each transmitting antenna.

Downlink reference signals may include a common reference signal (CRS) shared with all user equipments in a cell and a dedicated reference signal (DRS) for a specific user equipment only. By these reference signals, information for channel estimation and demodulation can be provided.

A receiving side (e.g., user equipment) estimates a state of a channel from CRS and may be able to feed back such an indicator related to a channel quality as CQI (Channel Quality Indicator), PMI (Precoding Matrix Index) and RI (Rank Indicator) to a transmitting side (e.g., base station). In this case, the CRS may be called a cell-specific reference signal.

Meanwhile, DRS may be transmitted on a corresponding RE if demodulation of data on PDSCH is necessary. A user equipment many be informed of a presence or non-presence of DRS by an upper layer. In particular, the user may be informed that the DRS is valid only if the corresponding PDSCH is mapped. The DRS may be called a UE-specific reference signal or a demodulation reference signal (DMRS).

Figure 8:
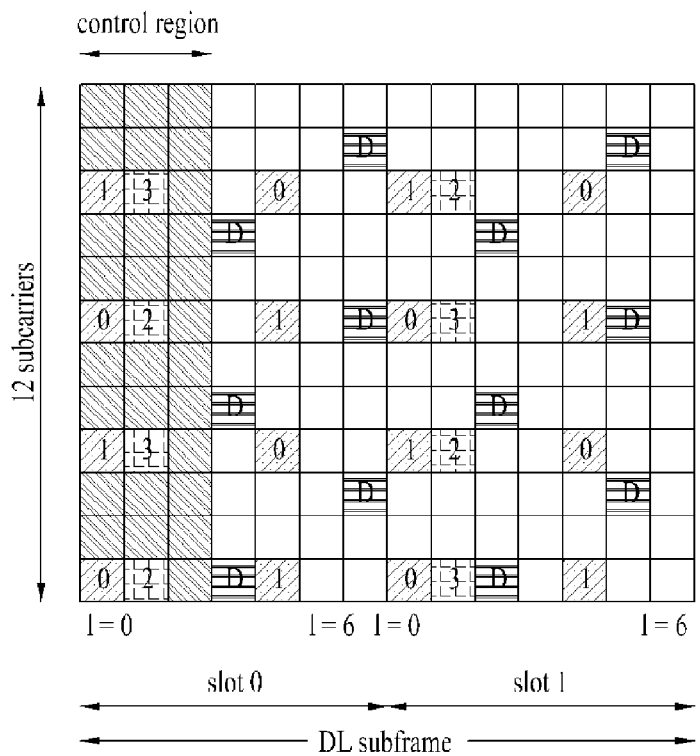
FIG. 8 is a diagram of CRS and DRS patterns defined by the conventional 3GPP LTE system.
Figure 8:
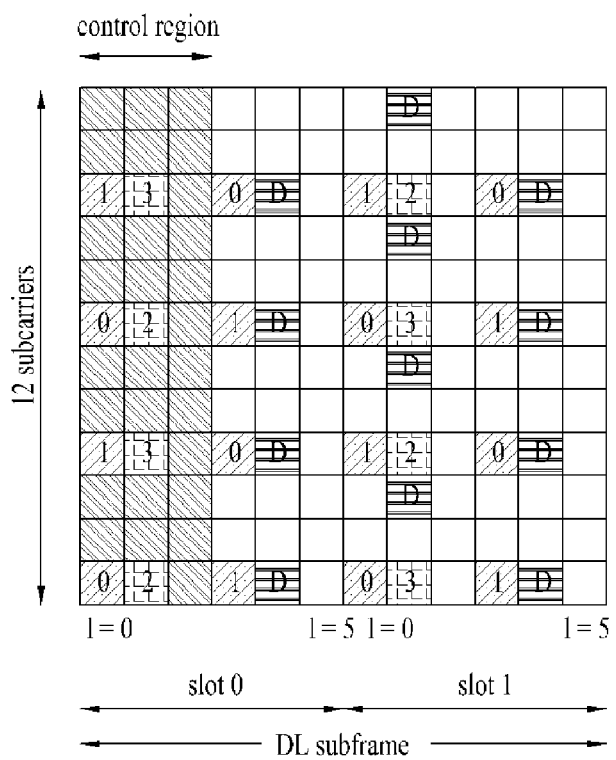

FIG. 8 shows that CRS and DRS patterns defined by the conventional 3GPP LTE system (e.g., Release-8) are mapped on a downlink resource block. The downlink resource block, which is a unit for mapping a reference signal, may be represented as a unit of '1 subframe on time×12 subcarriers on frequency'. In particular, one resource block may have a length of 14 OFDM symbols on time in case of a normal CP [FIG. 8 (a)] or a length of 12 OFDM symbols in case of an extended CP [FIG. 8 (b)].

FIG. 8 shows a position of a reference signal on a resource block in a system having a base station support 4 transmitting antennas. In FIG. 8, resource elements (REs) indicated by 0, 1, 2 and 3 indicate positions of CRS for antenna port indexes 0, 1, 2 and 3, respectively. Meanwhile, a resource element indicated by 'D' in FIG. 8 indicates a position of DRS.

In the following description, CRS is explained in detail.

First of all, CRS is used to estimate a channel of a physical antenna stage. The CRS is a reference signal receivable in common by all user equipments (UEs) in a cell and is distributed over a whole band. The CRS may be used for the purpose of channel state information (CSI) acquisition and data demodulation.

The CRS may be defined in various forms in accordance with antenna configuration. 3GPP LTE (e.g., Release-8) system supports various antenna configurations and a downlink signal transmitting side (e.g., base station) may have three kinds of antenna configurations including a single antenna, 2 transmitting antennas, 4 transmitting antennas and the like. In case that a base station performs a single antenna transmission, a reference signal for a single antenna port is arranged. In case that a base station performs 2-antenna transmission, reference signals for 2 antenna ports are arranged by time division multiplexing and/or frequency division multiplexing. In particular, the reference signals for 2 antenna ports are arranged on different time resources and/or different frequency resources to be discriminated from each other. In case that a base station performs 4-antenna transmission, reference signals for 4 antenna ports are arranged by TDM/FDM. Channel information estimated via CRS by a downlink signal receiving side (e.g., user equipment) may be used for demodulation of data transmitted by such a transmission scheme as Single Antenna Transmission, Transmit diversity, Closed-loop Spatial multiplexing, Open-loop Spatial multiplexing), Multi-User MIMO (MU-MIMO) and the like.

In case that MIMO is supported, when a reference signal is transmitted from a prescribed antenna port, a reference signal is carried on a resource element (RE) at a position designated in accordance with a reference signal pattern but any signal is not carried on a resource element (RE) at a position designated from another antenna port.

A rule for mapping CRS on a resource block follows Formula 12.

$$k = 6m + (v + v_{shift}) \mod 6 \qquad \text{[Formula 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases}$$

$$v_{shift} = N_{ID}^{cell} \mod 6$$

In Formula 12, k indicates a subcarrier index, l indicates a symbol index, and p indicates an antenna port index. $N_{symb}^{DL}$ indicates the number of OFDM symbols of one downlink slot, $N_{RB}^{DL}$ indicates the number of resource blocks allocated to downlink, $n_s$ indicates a slot index, and $N_{ID}^{cell}$ indicates a cell ID. 'mod' means a modulo operation. A position of a reference signal in frequency domain depends on a value of $V_{shift}$. Since the $V_{shift}$ value depends on a cell ID as well, a position of a reference signal has a frequency shift value different per cell.

In particular, a position in frequency domain may be set to differ by being shifted in order to raise channel estimation performance through CRS. For instance, if a reference signal is situated at every 3 subcarriers, a prescribed cell enables the reference signal to be arranged on a subcarrier of 3k and another cell enables the reference signal to be arranged on a subcarrier of 3k+1. In viewpoint of one antenna port, a reference signal is arranged by 6-RE interval (i.e., 6-subcarrier interval) in frequency domain and maintains 3-RE interval in frequency domain from an RE on which a reference signal for another antenna port is arranged.

For the CRS, power boosting may be applicable. In this case, the power boosting means that a reference signal is transmitted with higher power in a manner of bringing power not from an RE allocated for the reference signal but from another RE among resource elements (REs) of one OFDM symbol.

A reference signal position in time domain is arranged by a predetermined interval by setting symbol index (l) 0 of each slot to a start point. A time interval is defined different in accordance with a CP length. In case of a normal CP, a reference signal is situated at a symbol index 0 of a slot and a reference signal is situated at a symbol index 4 of the slot. Reference signals for maximum 2 antenna ports are defined on one OFDM symbol. Hence, in case of 4-transmitting antenna transmission, reference signals for antenna ports 0 and 1 are situated at symbol indexes 0 and 4 (or symbol indexes 0 and 3 in case of an extended CP) of a slot, respectively and reference signals for antenna ports 2 and 3 are situated at symbol index 1 of the slot. Yet, frequency positions of the reference signals for the antenna ports 2 and 3 may be switched to each other in a $2^{nd}$ slot.

In order to support spectral efficiency higher than that of the conventional 3GPP LTE (e.g., Release-8) system, it may be able to design a system (e.g., LTE-A) system having an extended antenna configuration. For instance, the extended antenna configuration may include an 8-transmitting antenna configuration. In the system having the extended antenna configuration, it may be necessary to support user equipments operating in the conventional antenna configuration. Namely, it may be necessary to support backward compatibility. Hence, it may be necessary to support a reference signal pattern according to the conventional antenna configuration and it may be necessary to design a new reference signal pattern for an additional antenna configuration. In this case, if CRS for a new antenna port is added to a system having a conventional antenna configuration, a reference signal overhead rapidly increases to lower a data rate. In consideration of this matter, it may be necessary to design a new reference signal (CSI-RS) for a channel state information (CSI) measurement for the new antenna port, which will be described in detail after description of DRS.

In the following description, DRS is explained in detail.

First of all, DRS (or UE-specific reference signal) is a reference signal used for data demodulation. When MIMO transmission is performed, a precoding weight used for a specific user equipment in MIMO transmission is used for a reference signal as it is. Hence, when a user equipment receives a reference signal, it may be able to estimate an equivalent channel having a transmission channel combined with the precoding weight transmitted from each transmitting antenna.

The conventional 3GPP LTE system (e.g., Release-8) supports maximum 4-transmitting antenna transmission and DRS for rank 1 beamforming is defined. The DRS for the rank 1 beamforming may be represented as a reference signal for antenna port index 5. A rule for mapping DRS on a resource block may follow Formula 13 and Formula 14. Formula 13 relates to a normal CP, while Formula 14 relates to an extended CP.

$$k = (k') \bmod N_{sc}^{RB} + N_{sc}^{RB} \cdot n_{PRB} \quad \text{[Formual 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

-continued $$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Formual 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Formula 13 and Formula 14, k indicates a subcarrier index, l indicates a symbol index, and p indicates an antenna port index. $N_{SC}^{RB}$ indicates a resource block size in frequency domain and may be represented as the number of subcarriers. $n_{PRB}$ indicates a physical resource block number. And, $N_{RB}^{PDSCH}$ indicates a bandwidth of a resource block of a corresponding PDSCH transmission. $n_s$ indicates a slot index and $N_{ID}^{cell}$ indicates a cell ID. Moreover, 'mod' means a modulo operation. A position of a reference signal in frequency domain depends on a value of $V_{shift}$. Since the $V_{shift}$ value depends on a cell ID as well, a position of a reference signal has a frequency shift value different per cell.

Meanwhile, in a system of LTE-A (LTE-Advanced) evolved from 3GPP LTE, MIMO of high order, multi-cell transmission, advanced MU-MIMO and the like are taken into consideration. In order to support efficient reference signal management and advanced transmission scheme, DRS based data demodulation is taken in to consideration. In particular, aside from DRS (antenna port index 5) for rank 1 beamforming defined by the conventional 3GPP LTE (e.g., Release-8), in order to support data transmission via an added antenna, it may be able to define DRSs for at least two layers, respectively.

When DRS for supporting maximum rank 8 transmission is arranged on a radio resource, DRSs for respective layers may be arranged in a manner of being multiplexed together. TDM (time division multiplexing) means that DRSs for at least two layers are arranged on different time resources (e.g., OFDM symbols), respectively. FDM (frequency division multiplexing) means that DRSs for at least two layers are arranged on different frequency resources (e.g., subcarriers), respectively. CDM (code division multiplexing) means that DRSs for at least two layers arranged on the same radio resource are multiplexed together using orthogonal sequence (or, orthogonal covering).

This DRS may be preferably set to exist in a resource block and layer for which a downlink transmission is scheduled by a base station. And, an example of a detailed arrangement pattern will be described later.

Cooperative Multi-Pont (CoMP)

In accordance with an improved system performance requirement of 3GPP LTE-A system, CoMP transmission/ reception scheme (represented as one of co-MIMO (collaborative MIMO), network MIMO, etc.) has been proposed. CoMP may raise performance of a user equipment located at a cell edge and may raise average sector throughput as well. Generally, in a multi-cell environment having a frequency reuse factor set to 1, the performance and average sector throughput of the user equipment located at the cell edge may be lowered due to inter-cell interference (ICI). In order to reduce the ICI, a conventional LTE system has applied a method of providing an appropriate throughput performance to a user equipment located at a cell edge in an environment restricted by interference using a simple manual scheme such as FFR (fractional frequency reuse) via UE-specific power control and the like. Yet, reducing the ICI or reusing the ICI as a signal desired by a user equipment may be more preferable than lowering a frequency resource use per cell. To achieve this object, there are ongoing proposals of several CoMP schemes (e.g., joint processing, coordinated scheduling/beamforming, etc.).

In order to smoothly support this CoMP operation, it may be necessary to design a downlink reference signal appropriately.

Relay Node Related Subframe Structure

A relay node may deliver data received from a base station to a user equipment in a relay node area and may deliver data received from the user equipment in the relay node area to the base station. The relay node may be connected to the base station by wireless via Un interface and a radio link between the base station and the relay node may be named a backhaul link. A link from the base station to the relay node may be named a backhaul downlink and a link from the relay node to the base station may be named a backhaul uplink. The relay node may be connected to the user equipment by wireless via Uu interface and a radio link between the relay node and the user equipment may be named an access link. A link from the relay node to the user equipment may be named an access downlink and a link from the user equipment to the relay node may be named an access uplink. The base station requires a downlink transmission function and an uplink reception function only, while the user equipment requires an uplink transmission function and a downlink reception function only. Yet, the relay node requires a downlink transmission function, a downlink reception function, an uplink transmission function and an uplink reception function.

If a backhaul link operates on the same frequency band of an access link, it may be called 'in-band'. If a backhaul link and an access link operate on frequency bands different from each other, respectively, it may be called 'out-band'.

In case of an in-band relay node, for example, if a backhaul DL reception from a base station and an access DL transmission to a user equipment are simultaneously performed on a prescribed frequency band, a transmission signal from a transmitting stage of the relay node may be received by a receiving stage of the relay node. Hence, signal interference may occur at an RF front-end of the relay node. Similarly, if an access UL reception from the user equipment and a backhaul UL transmission to the base station are simultaneously performed on a prescribed frequency band, signal interference may occur at the RF front-end of the relay node.

In order to avoid this signal interferences, the relay node may be able to use TDM (time division multiplexing) to prevent transmission and reception from occurring simultaneously on the same frequency band. This relay node may correspond to a half-duplex relay node. For instance, a backhaul DL reception and an access DL transmission may be configured by TDM and a guard time for the switching between a reception function and a transmission function in a subframe for a relay node (hereinafter named a relay subframe) may be required. For instance, since a control interval (e.g., first 2 or 3 CFDM symbols) of a DL subframe need to be always transmitted to a user equipment, a guard time may be set to OFDM symbol right next to the control interval of the DL subframe and/or last 1 or 2 OFDM symbols of the DL subframe.

As a relay node is introduced, since there exists an CFDM symbol duration not allocated for a reference signal in a subframe, it may be necessary to appropriately design a downlink reference signal in consideration of the characteristics of the relay node operation.

As mentioned in the above description, the conventional 3GPP system (e.g., Release-8) uses a reference signal for both channel measurement and data demodulation. And, CRS in LTE system is used for data demodulation rather than channel measurement. Hence, it may be preferable that two kinds of reference signals different from each other are defined for the purposes of the channel measurement and the data demodulation, respectively. In particular, CSI-RS is defined for the channel measurement and DMRS (or DRS) may be separately defined for the data demodulation. Various embodiments of the present invention mentioned in the following description relate to reference signals used for the downlink (DL) MIMO transmission, and more particularly, to CSI-RS pattern to provide efficient channel measurement capable of supporting both MIMO operation and CoMP operation.

Before looking into CSI-RS pattern, since 3GPP LTE-A system needs to support user equipments operating in the conventional 3GPP LTE system (i.e., backward compatibility), it may be necessary to maintain patterns of reference signals defined by the conventional 3GPP LTE system.

As mentioned in the foregoing description with reference to FIG. 8, a unit (e.g., one resource block) of defining a pattern of a DL reference signal may be constructed with '1 subframe on time×12 contiguous subcarriers on frequency'. One subframe includes 2 contiguous slots. In case of a normal CP, one subframe includes 14 OFDM symbols. In case of an extended CP, one subframe includes 12 OFDM symbols.

In order to determine OFDM symbol at which a new reference signal (CSI-RS) for an added antenna port can be situated in 3GPP LTE-A system, a previously defined CRS position, a position for arranging a synchronization signal thereon and OFDM symbol for arranging a physical broadcast channel (PBCH) thereon are described as follows.

First of all, CRS is situated at 6 OFDM symbols in one resource block (e.g., OFDM symbol index (l)=0, 1 and 4 in each of 2 slots in case of a normal CP, OFDM symbol index (l)=0, 1 and 3 in each of 2 slots in case of an extended CP, etc.). A synchronization signal may be situated at subframe indexes 0 and 5 in one radio frame and may be situated at last 2 OFDM symbols (e.g., OFDM symbol index (l)=5 and 6 in case of a normal CP, OFDM symbol index (l)=4 and 5 in case of an extended CP, etc.) of a slot index 0 (first slot) of one subframe. And, PBCH may be situated at subframe index 0 in one radio frame and may be situated at first 4 OFDM symbols (e.g., OFDM symbol index (l)=0, 1, 2 and 3 in case of a normal CP or an extended CP) of a slot index 1 (second slot) of a subframe.

In case that CSI-RS is transmitted on OFDM symbol at which a previous CRS is situated, insufficient transmission power may be allocated for the CSI-RS by power boosting of CRS. In this case, channel estimation performance may be degraded. Hence, CSI-RS may be arranged on OFDM symbol having the previous CRS not arranged thereon.

If CSI-RS is transmitted on OFDM symbol on which a synchronization signal and PBCH are arranged, a resource element for channel measurement may be punctured. Hence, a subframe having the synchronization signal and the PBCH not carried therein may be allocated for CSI-RS transmission.

For channel measurement of 8 transmitting antennas requested by 3GPP LTE-A system, in addition to CRS for the previous antenna ports 0 to 3, it may be necessary to support CSI-RS for antenna ports 4 to 7. Alternatively, the newly defined CSI-RS may be defined not only for antenna ports 4 to 7 but also for antenna ports 0 to 7. Antenna port index is provided to clearly indicate an additional antenna port, which is just exemplary and by which the present invention is non-limited. And, 12 resource elements on one OFDM symbol may be usable for CSI-RS entirely or in part.

In consideration of the above-mentioned items, CSI-RS patterns according to various embodiments of the present invention are described as follows. The various embodiments for the CSI-RS patterns mentioned in the following description relate to efficient resource allocation and performance gain in downlink 8-transmitting antenna transmission. In the following embodiments, a case of MIMO transmission is mainly taken as an example, by which the present invention is non-limited. Variously proposed CSI-RS patterns may be usable for CoMP transmission or may be used as a downlink transmission subject by a relay node.

$1^{st}$ Embodiment

A $1^{st}$ embodiment relates to a CSI-RS pattern in case of an extended CP.

Since CSI-RS pattern needs to be designed in consideration of a position of DMRS, the position of the DMRS is described in the first place as follows.

Figure 9:
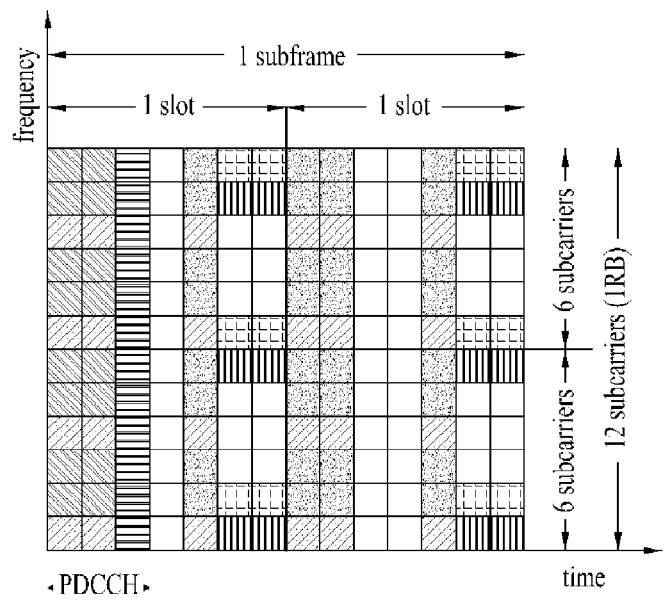
FIG. 9 and FIG. 10 are diagrams for examples of DMRS pattern.
Figure 9:
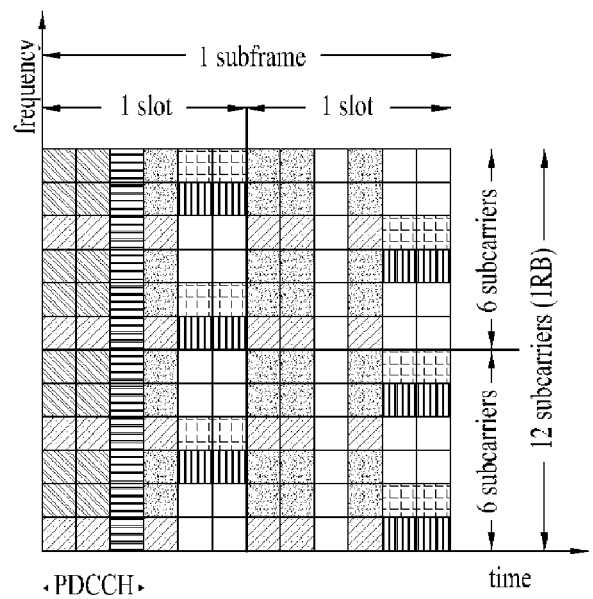

FIG. 9 is a diagram for example of DMRS pattern. FIG. 9 (a) shows DMRS pattern in case of a normal CP. FIG. 9 (b) shows DMRS pattern in case of an extended CP in consideration of a case that a channels state experiences a large delay spread. In case of the large delay spread, the DMRS pattern shown in FIG. 9 (a) may have channel measurement performance lower than that shown in FIG. 9 (b).

Referring to FIG. 9, DMRS for a low transmission rank and DMRS for a high transmission rank are displayed in a manner of being discriminated from each other. For instance, the number (i.e., DMRS overhead) of resource elements (REs) for DMRS in case of a low transmission rank may be set on one resource block lower than that in case of a high transmission rank. In this case, a transmission rank as a reference may include rank 2 for example. In particular, 12 REs are used for DMRS for transmission rank 1 and transmission rank 2. In case of transmission ranks 3 to 8, all of 24 REs may be used for DMRS.

CSI-RS pattern available for the case of the DMRS pattern shown in FIG. 9 is described as follows. As mentioned in the foregoing description, it may be able to consider a design in a manner that CSI-RS is not arranged on a control region (e.g., PDCCH allocated OFDM symbol) in DL subframe, CRS allocated OFDM symbol or OFDM symbol having a guard time allocated in a relay subframe. In this case, CSI-RS may be arranged on no-reference-signal-arranged OFDM symbol which is different from the DMRS arranged OFDM symbol.

In this case, assume a design that 6-RE interval is provided between 2 CSI-RSs for one antenna port. For instance, CSI-RSs for one antenna port can be arranged at positions of OFDM symbol indexes 9 and 10 by 6-subcarrier interval in case of a normal CP. Yet, in case of an extended CP, there is no OFDM symbol in order to arrange 2 CSI-RSs for one antenna port on one OFDM symbol.

Figure 10:
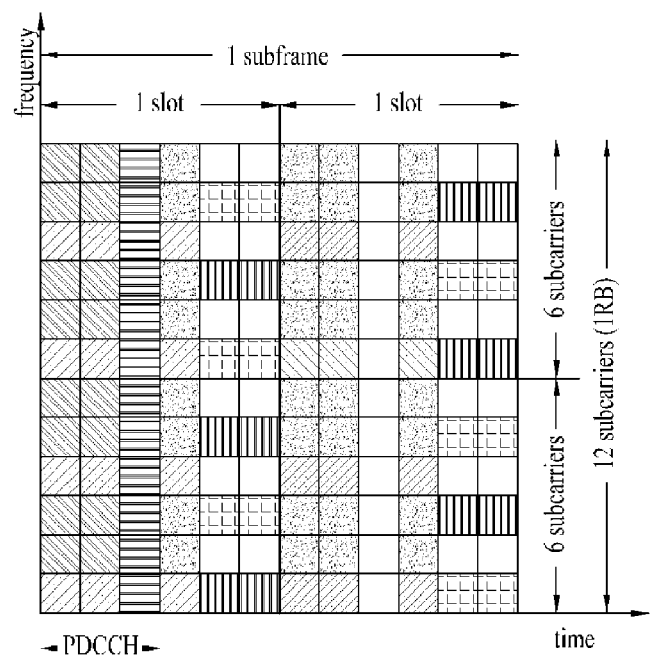

To overcome such limitation, it may be able to consider DMRS pattern of another type. For instance, in case of an extended CP, instead of arranging DMRS for a low transmission rank and DMRS for a high transmission rank on contiguous subcarriers, the DMRSs may be arranged in a manner of being spaced apart from each other by 1- or 2-subcarrier interval. FIG. 10 shows one example of this DMRS pattern. Referring to FIG. 10, in case that DMRSs are arranged by being spaced apart from each other by 1-subcarrier interval, DMRSs may be arranged at 6 RE positions on one OFDM symbol. In case that DMRSs are arranged by being spaced apart from each other by 2-subcarrier interval, DMRSs may be arranged at 4 RE positions on one OFDM symbol. When the DMRSs are arranged in the above manner, if CSI-RS and DMRS are arranged on the same OFDM symbol, CSI-RS for one antenna port can be arranged in 6-subcarrier interval on one OFDM symbol. In FIG. 9 and FIG. 10, details of CSI-RS patterns will be explained in the description of the following embodiment.

$2^{nd}$ Embodiment

A $2^{nd}$ embodiment relates to a downlink reference signal pattern in accordance with a different subframe type.

Generally, in order to reduce unnecessary system complexity, it may be preferable that a reference signal design rule is applied as simple as possible. Hence, a similar or identical reference signal pattern is preferably applied to a subframe of a different type.

Regarding this, in case of a special subframe including DwPTS and a relay subframe in a frame structure of TDD type, since there is an interval on which a reference signal can not be arranged, it may be able to appropriately design a reference signal pattern in consideration of such an interval.

DwPTS length in a special subframe of a frame structure of TDD type is different from that in a normal subframe. For instance, in case of a normal CP, DwPTS length may have one of lengths of 3 OFDM symbols, 9 OFDM symbols, 10 OFDM symbols, 11 OFDM symbols and 12 OFDM symbols. For another instance, in case of an extended CP, DwPTS length may have one of lengths of 3 OFDM symbols, 7 OFDM symbols, 8 OFDM symbols, 9 OFDM symbols, and 10 OFDM symbols. If the DwPTS has the length of 3 OFDM symbols, data is not transmitted. Hence, DMRS is unnecessary. Otherwise, DMRS position may be determined to avoid degrading data demodulation performance due to the insufficient number of REs on which DMRS is arranged. Moreover, in order to support a case that channel measurement is necessary via a special subframe including DwPTS, it may be able to design CSI-RS pattern. For instance, when a number of backhaul link subframes are allocated to one radio frame in a relay subframe structure, it may be necessary to measure a channel in a special subframe inevitably irrespective of the number of spare REs.

Figure 11:
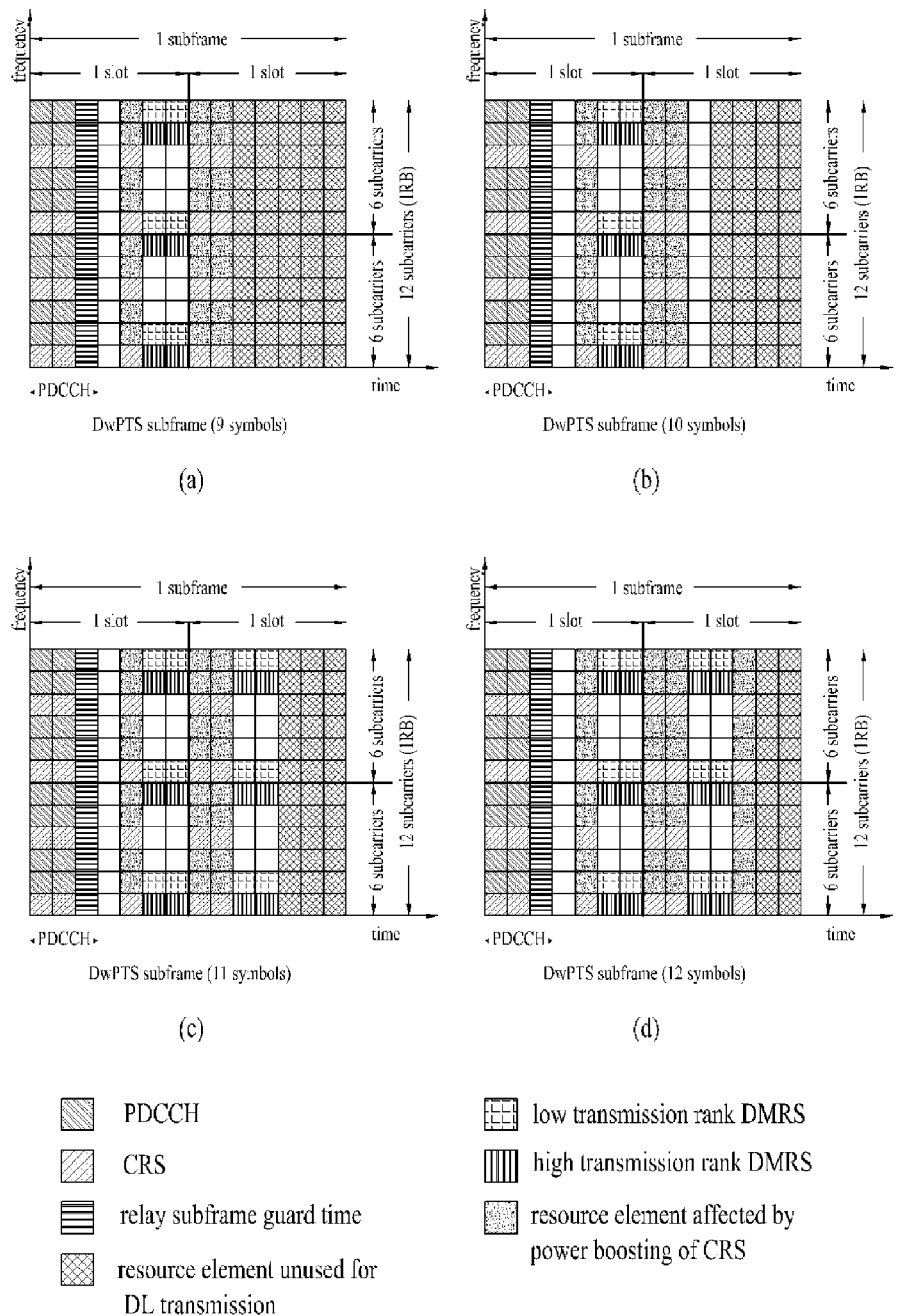
FIGS. 11 to 13 are diagrams for examples of a reference signal pattern in special subframe.
Figure 12:
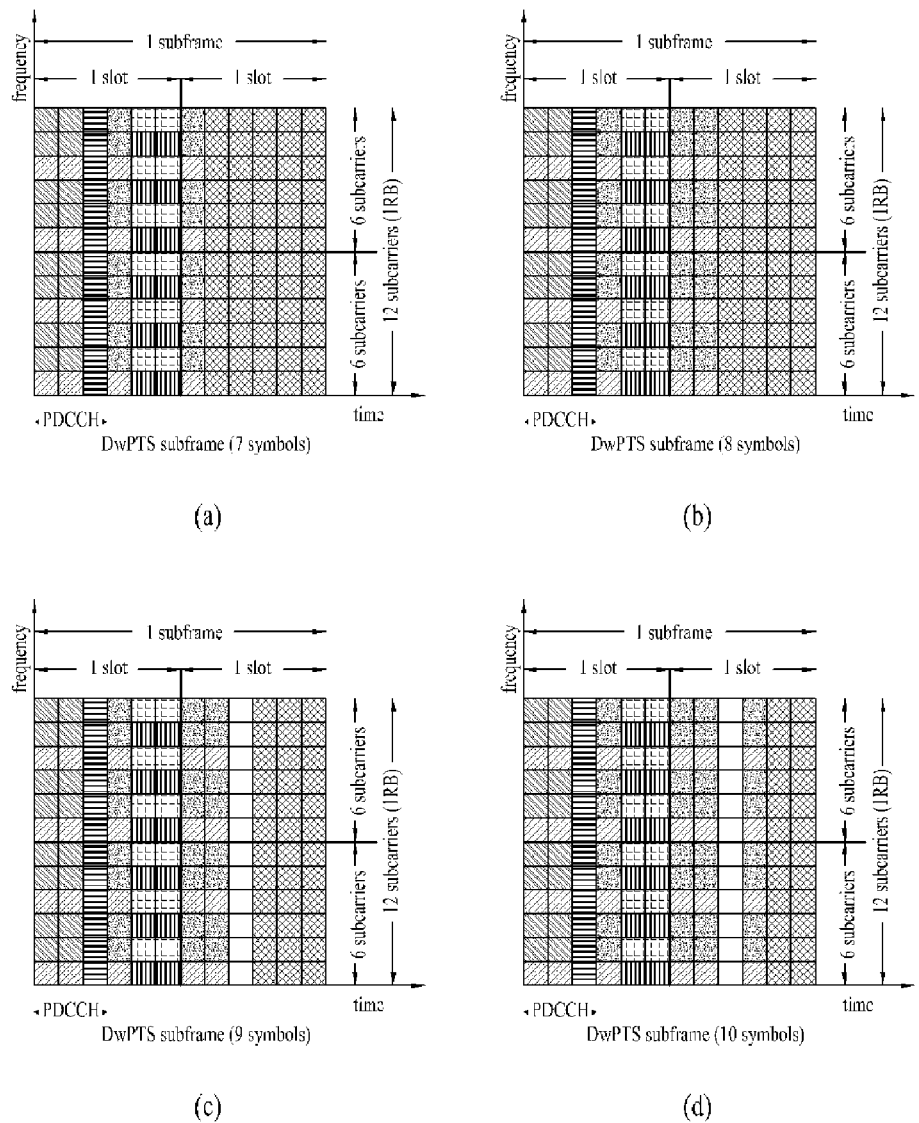
Figure 13:
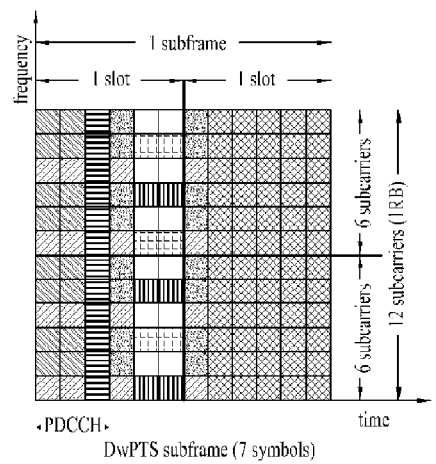
Figure 13:
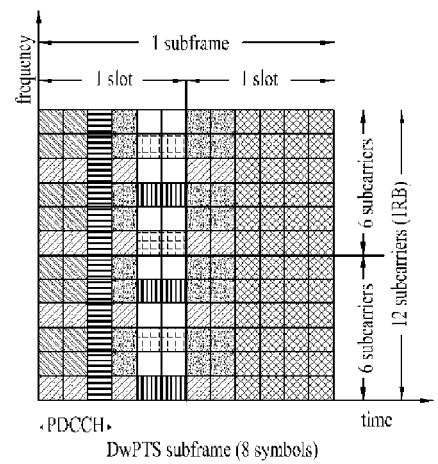
Figure 13:
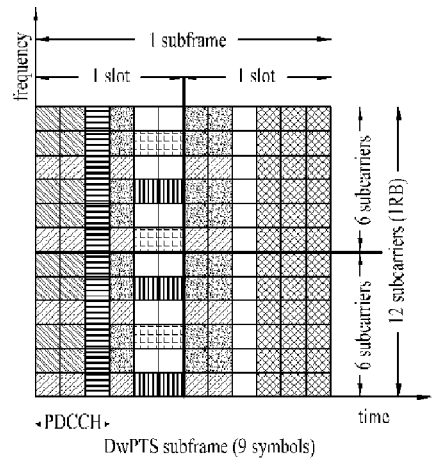
Figure 13:
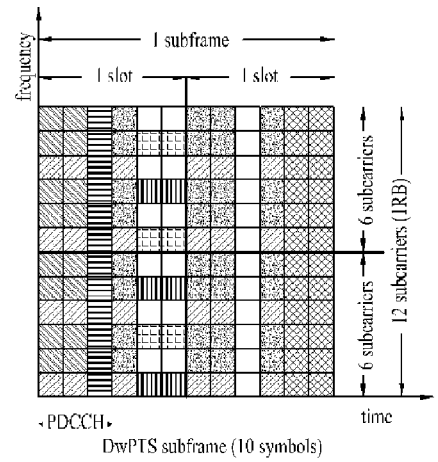

FIGS. 11 to 13 are diagrams for examples of a reference signal pattern in a special subframe including DwPTS. FIG. 11 shows a reference signal pattern in case of a normal CP. FIG. 12 shows a reference signal pattern in case of an extended CP. FIG. 13 shows a reference signal pattern in case of an extended CP. FIG. 11 (a) shows a reference signal pattern if DwPTS length is 9-OFDM symbol length. FIG. 11 (b) shows a reference signal pattern if DwPTS length is 10-OFDM symbol length. FIG. 11 (c) shows a reference signal pattern if DwPTS length is 11-OFDM symbol length. FIG. 11 (d) shows a reference signal pattern if DwPTS length is 12-OFDM symbol length. FIG. 12 (a) shows a reference signal pattern if DwPTS length is 7-OFDM symbol length. FIG. 12 (b) shows a reference signal pattern if DwPTS length is 8-OFDM symbol length. FIG. 12 (c) shows a reference signal pattern if DwPTS length is 9-OFDM symbol length. FIG. 12 (d) shows a reference signal pattern if DwPTS length is 10-OFDM symbol length. FIG. 13 (a) shows a reference signal pattern if DwPTS length is 7-OFDM symbol length. FIG. 13 (b) shows a reference signal pattern if DwPTS length is 8-OFDM symbol length. FIG. 13 (c) shows a reference signal pattern if DwPTS length is 9-OFDM symbol length. FIG. 13 (d) shows a reference signal pattern if DwPTS length is 10-OFDM symbol length. FIG. 12 shows a reference signal pattern formed by shifting DMRS position of a $2^{nd}$ slot to a $1^{st}$ slot in the DMRS pattern shown in FIG. 9 (b). FIG. 13 shows a reference signal pattern formed by maintaining DMRS pattern of a $1^{st}$ slot by discarding DMRS pattern of a $2^{nd}$ slot in the DMRS pattern shown in FIG. 10. In the reference signal patterns shown in FIGS. 11 to 13, a resource element for allocating CSI-RS thereto may be limited to a $1^{st}$ slot. In particular, in case of a special subframe including DwPTS, it may be able to consider that DMRS and CSI-RS are arranged in a $1^{st}$ slot only.

Basically, for the different subframe types of normal and special subframes or normal and extended CPs, a common rule may be preferably applied to a position of CSI-RS as much as possible. Regarding this, after a basic CSI-RS pattern has been determined, a different CSI-RS pattern may be preferably determined in a manner of frequency-shifting (i.e., v-shifting) or time-shifting (i.e., t-shifting) the basic CSI-RS pattern. Detailed patterns of the CSI-RS shown in FIGS. 11 to 13 will be explained in the description of the following embodiment.

$3^{rd}$ Embodiment

A $3^{rd}$ embodiment relates to restricting a transmission rank in case of a special subframe.

In FIGS. 11 to 13 related to the aforesaid $2^{nd}$ embodiment, in case of a special subframe including DwPTS for an extended CP, it may cause a problem that the number of REs usable for data or CSI-RS transmission is decremented. In order to secure the REs for the data or CSI-RS transmission, transmission of some of other reference signals may be restricted.

Regarding this, DMRS overhead may be determined different in accordance with a rank. For instance, DMRS overhead may be determined as 12 REs up to rank-2 transmission or 24 REs for transmissions of rank 3 or higher. For another instance, DMRS overhead may be determined as 12 REs up to rank-4 transmissions or 24 REs for transmissions of rank 5 or higher.

Accordingly, in a special subframe including DwPTS in case of an extended CP, in order to secure RE for data or CSI-RS transmission, it may be able to restrict a transmission rank equal to or lower than a specific rank (e.g., 2, 4, etc.).

Figure 14:
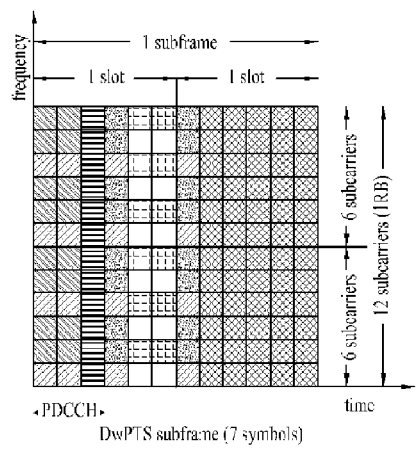
FIG. 14 is a diagram of a reference signal pattern when a transmission rank is restricted.
Figure 14:
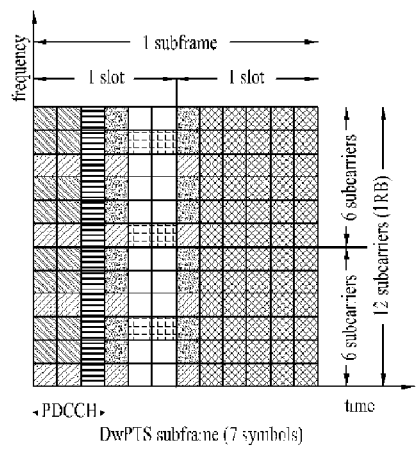

FIG. 14 shows a reference signal pattern when a transmission rank is restricted. FIG. 14 (a) shows a case that DMRS for a high transmission rank is not defined in the reference signal pattern shown in FIG. 12 (a). FIG. 14 (b) shows a case that DMRS for a high transmission rank is not defined in the reference signal pattern shown in FIG. 13 (a). According to this reference signal pattern, in a special subframe including DwPTS in case of an extended CP, more resources may be allocated for data or CSI-RS.

$4^{th}$ Embodiment

A $4^{th}$ embodiment relates to defining a relation between reference signal patterns set different from each other in accordance with subframe types.

A case of a normal subframe is defined as a basic reference signal pattern and a case of a special subframe may be defined as a modification of the basic reference signal pattern. When a modified reference signal pattern is being used in case of a special subframe, if the special subframe is changed into a normal subframe, the modified reference signal pattern may be switched back to the basic reference signal pattern. This may be called a fall-back of a reference signal pattern.

How to design a basic CSI-RS pattern is described as follows.

First of all, CSI-RS may generally cause performance degradation to a user equipment according to the conventional 3GPP LTE system (e.g., Release-8) in which CSI-RS is not defined. Particularly, in aspect of a code block, in case that CSI-RS is transmitted by being concentrated on one position (e.g., one OFDM symbol), this performance degradation may get worse. This is because degradation of one code block may lower overall performance of transmission block. Moreover, in case that CSI-RS is allocated to one OFDM symbol, insufficient power boosting may be provided for the CSI-RS. Hence, it may be preferable that CSI-RS is distributively arranged on a plurality of OFDM symbols (e.g., 4 OFDM symbols) rather than arranged on one OFDM symbol. Considering RE on which CSI-RS can be arranged, a pattern of distributively arranging CSI-RS on a plurality of OFDM symbols may be effective in case of a normal subframe.

Meanwhile, in order to support channel measurement in a special subframe including DwPTS, positions (REs) having CSI-RS distributively arranged thereon may be shifted to specific OFDM symbols in a normal subframe. This shift of CSI-RS pattern may be called a time domain shift (or, T-shift) or a frequency domain shift (or, V-shift). For instance, at least one subcarrier (or subcarrier group) at CSI-RS position may be shifted in frequency domain or at least one symbol (or, symbol group) may be shifted in time domain, in a special subframe relative to CSI-RS pattern in a normal subframe.

In case that a subframe type is changed into a normal subframe from a special subframe (i.e., fall-back mode), CSI-RS pattern shifted in the special subframe may return to an original CSI-RS pattern position in the normal subframe.

Thus, CSI-RS pattern in accordance with a subframe type may be set to a pattern known to (or, previously defined by) a downlink transmitting stage and a downlink receiving stage instead of following a separate signaling or a separate rule.

$5^{th}$ Embodiment

A $5^{th}$ embodiment relates to details of V-shift and T-shift for the former CSI-RS pattern in the description of the $4^{th}$ embodiment.

$5^{th}$ Embodiment-1

$5^{th}$ embodiment-1 relates to one example of CSI-RS pattern for a case of a normal CP. In designing CSI-RS pattern, it may be necessary to consider CRS pattern and DMRS pattern. In case of a normal CP in a normal subframe, patterns of CRS and DMRS are described with reference to the example shown in FIG. 9 (a), by which the present embodiment may be non-limited. Moreover, the following principle of designing CSI-RS pattern according to the present invention may be applicable to CRS and DMRS patterns of different types as well.

In case of a normal CP in a normal subframe, CSI-RS is not allocated to RE on OFDM symbol in which CRS exists. As mentioned in the foregoing description, this is to prevent channel estimation performance from being degraded by CSI-RS due to the power boosting of the CRS. And, CSI-RS may be designed not to be arranged on a PDCCH region or a relay subframe guard time region. Hence, CSI-RS may be arranged on 7 OFDM symbols (e.g., $4^{th}$, $6^{th}$, $7^{th}$, $10^{th}$, $11^{th}$, $13^{th}$ and $14^{th}$ OFDM symbols) in one resource block (e.g., 14 OFDM symbols×12 subcarriers).

Figure 15:
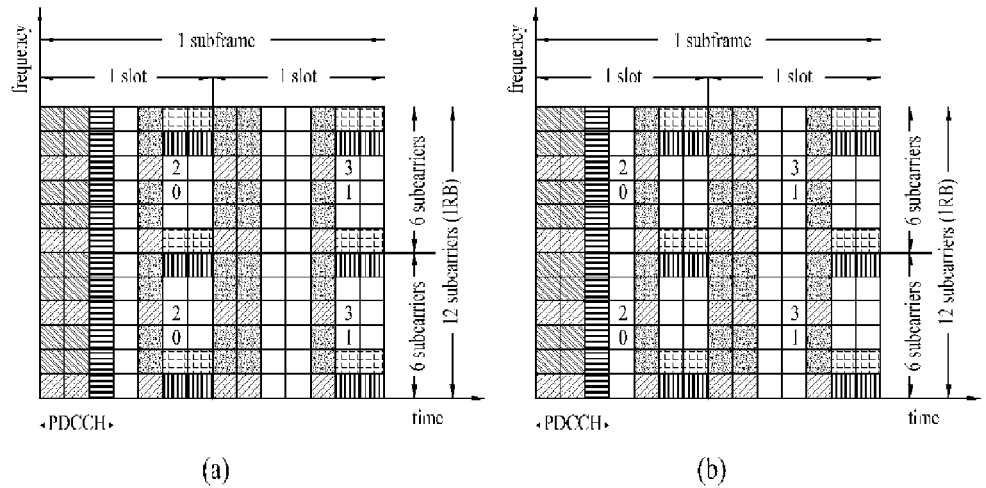
FIGS. 15 to 21 are diagrams for examples of CSI-RS pattern according to one embodiment of the present invention.
Figure 15:
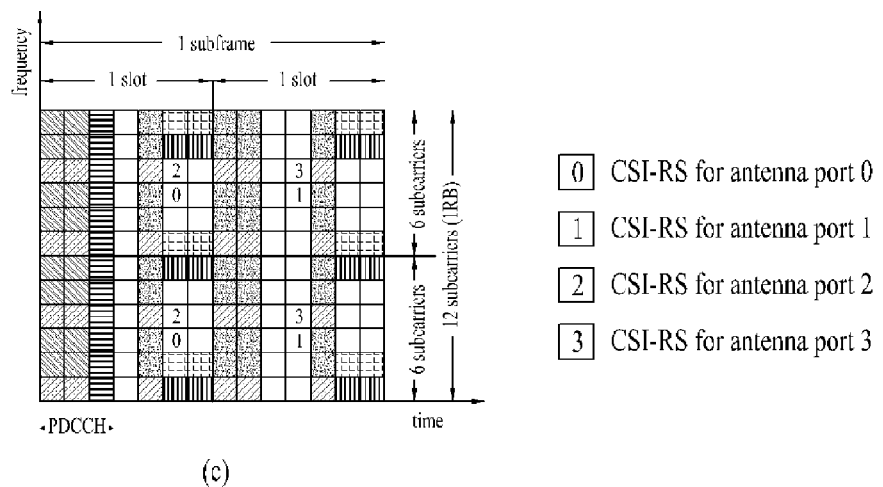

FIG. 15 shows examples of CSI-RS pattern according to the above settings. In FIG. 15, REs indicated by 0, 1, 2 and 3 indicate REs to which CSI-RSs for antenna port indexes 0, 1, 2 and 3 are allocated, respectively.

The CSI-RS pattern shown in FIG. 15 (a) may be defined as a basic CSI-RS pattern. A new CSI-RS pattern shown in FIG. 15 (b) or FIG. 15 (c) is provided to prevent CSI-RS pattern from being redundant in a different cell. If the CSI-RS pattern is set different for each cell, channel measurement performance can be enhanced.

The CSI-RS pattern shown in FIG. 15 (b) or FIG. 15 (c) may be described as T-shifted pattern of the basic CSI-RS pattern shown in FIG. 15 (a). T-shift may be indicated for all antenna ports of a partial group of the antenna ports. For instance, the CSI-RS pattern shown in FIG. 15 (b) is a version that CSI-RSs for all antenna ports 0, 1, 2 and 3 in the basic CSI-RS pattern shown in FIG. 15 (a) are T-shifted by 2 OFDM symbols. For another instance, the CSI-RS pattern shown in FIG. 15 (c) is a version that CSI-RSs for antenna port groups 1 and 3 in the basic CSI-RS pattern shown in FIG. 15 (a) are T-shifted by 2 OFDM symbols.

Figure 16:
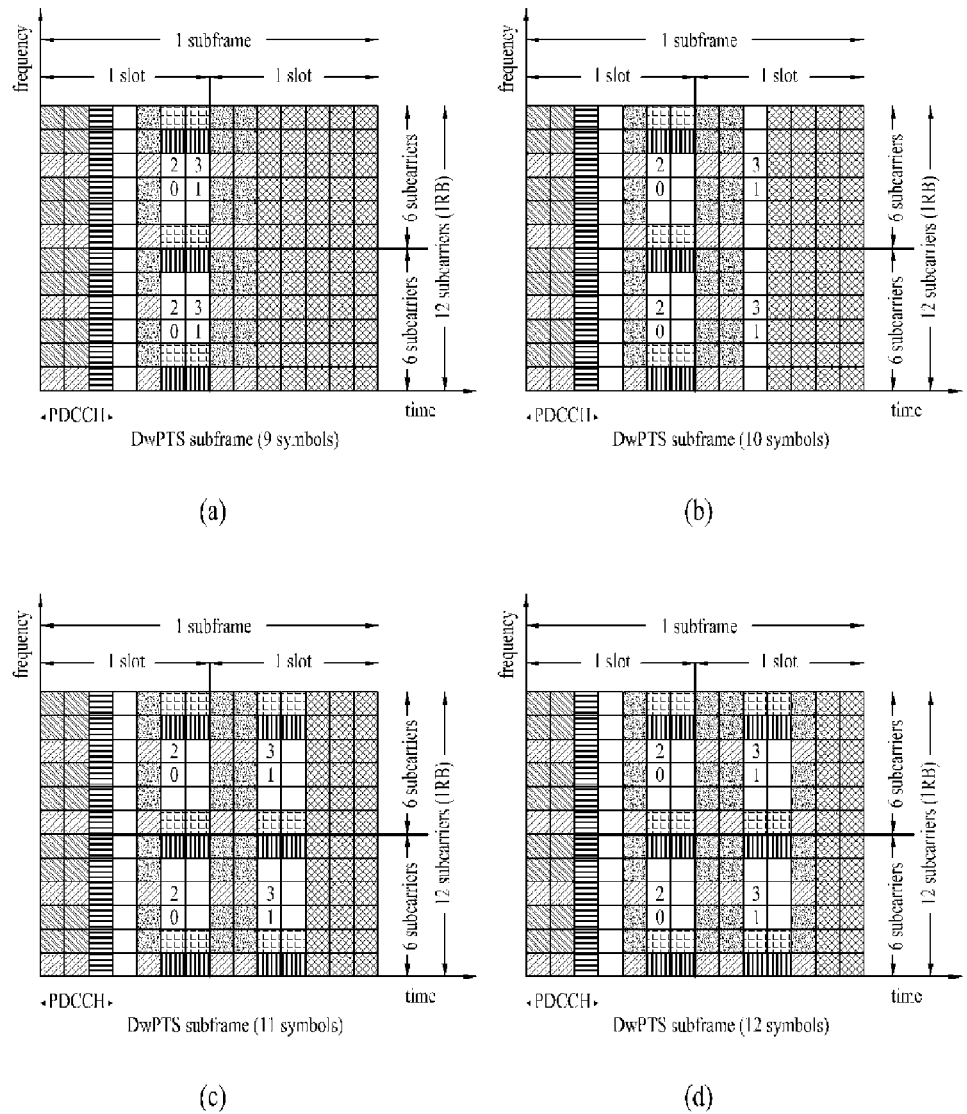

The T-shift of the CSI-RS pattern is useful in designing CSI-RS pattern in a special subframe. FIG. 16 shows CSI-RS pattern applicable in case of a special subframe. The CSI-RS pattern shown in FIG. 16 may be described as a T-shifted version of the CSI-RS pattern exemplarily shown in FIG. 15.

CRS and DMRS patterns shown in FIG. 16 (a) to FIG. 16 (d) follow the examples shown in FIG. 11 (a) to FIG. 11 (d), respectively. FIG. 16 (a) to FIG. 16 (d) show CSI-RS patterns in corresponding cases, respectively, by which the present invention may be non-limited. Moreover, the design principle of the CSI-RS pattern according to the present invention in the following description may be applicable to CRS and DMRS patterns of other types.

In accordance with the number of available OFDM symbols in a special subframe, CSI-RS pattern may vary. FIG. 16 (a) to FIG. 16 (d) show CSI-RS patterns if the numbers of available OFDM symbols are 9, 10, 11 and 12, respectively. In FIG. 16 (a) to FIG. 16 (d), although the CSI-RS patterns for the antenna ports 0 and 2 are identical in part, the CSI-RS patterns for the rest of the antenna ports 1 and 3 are T-shifted. For instance, with reference to the CSI-RS pattern shown in FIG. 16 (a), in the cases shown in FIG. 16 (b) to FIG. 16 (d), positions of CSI-RSs for the antenna port indexes 1 and 3 may be T-shifted by 3 OFDM symbols.

Meanwhile, since the number of REs, to which CSI-RS can be mapped, are restricted in case of a special subframe, CSI-RS for some of antenna ports may be transmitted only in one subframe. In particular, CSI-RSs for all antenna ports may be transmitted in at least two subframes. Accordingly, a receiving side receives all CSI-RSs via at least two subframes and may be able to perform channel measurement from the received CSI-RSs. Thus, a cycle of transmitting all reference signals may be represented as a duty cycle. For instance, if all CSI-RSs are transmitted in one subframe, a duty cycle can be represented as 1 subframe. For another instance, if all CSI-RSs are transmitted across two subframes, a duty cycle can be represented as 2 subframes.

In the above-mentioned CSI-RS pattern, CSI-RSs for all antenna ports may be set to be situated in a $1^{st}$ slot only. In particular, CSI-RSs can be set to be arranged on $4^{th}$, $6^{th}$ and $7^{th}$ OFDM symbols of one subframe [not shown in the drawing]. This may be represented as a version of T-shifted CSI-RS for some antenna port groups in the above-described CSI-RS pattern.

Figure 17:
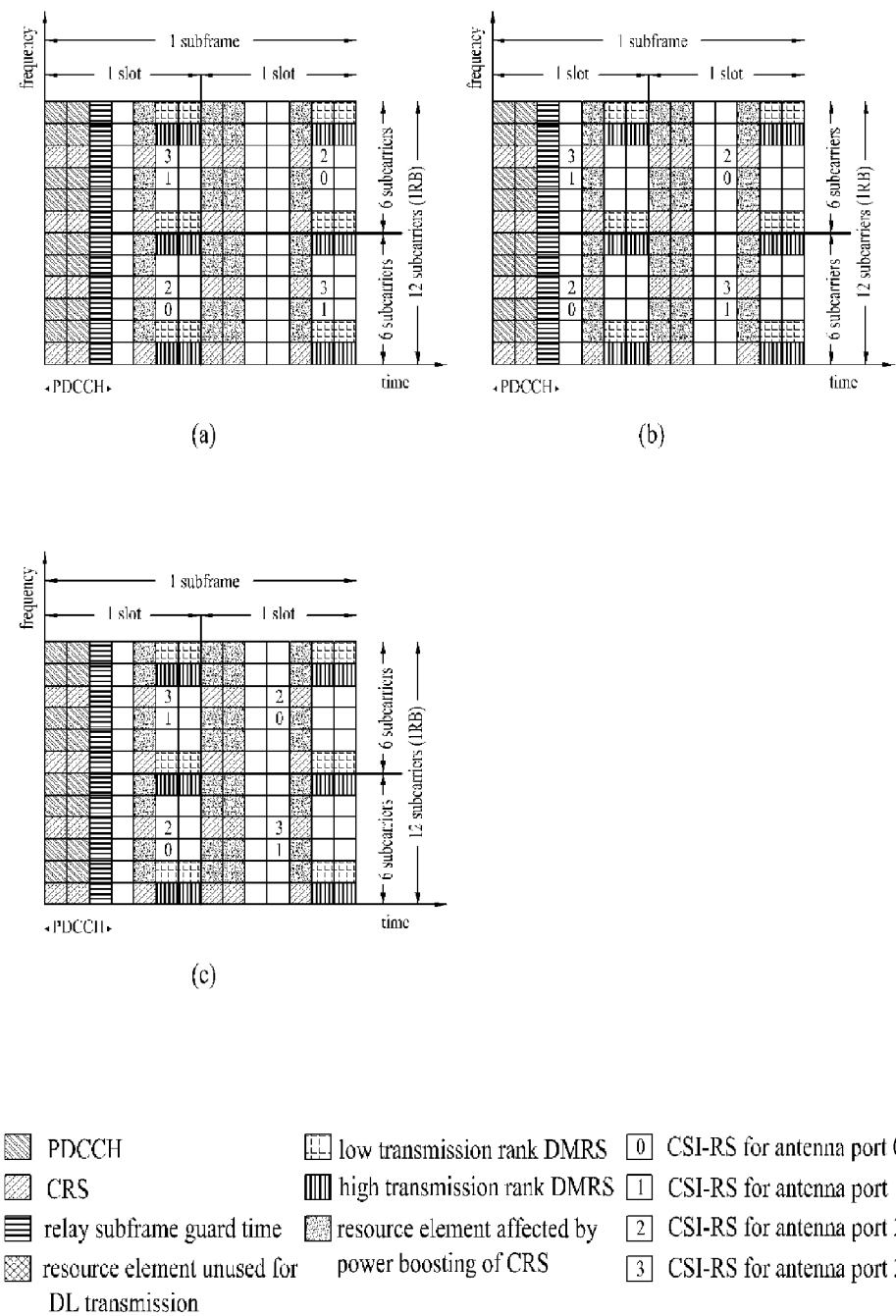

FIG. 17 shows CSI-RS pattern in which CSI-RSs for an antenna port group are arranged in staggered configuration. FIG. 17 (a) shows an example of a basic CSI-RS pattern. CSI-RS pattern shown in FIG. 17 (b) is a fully T-shifted version of the basic CSI-RS pattern shown in FIG. 17 (a). And, FIG. 17 (c) shows a partially T-shifted version of the basic CSI-RS pattern shown in FIG. 17 (a). Since the CSI-RS pattern shown in FIG. 17 has features similar to those of the CSI-RS pattern shown in FIG. 15 except that CSI-RS for a specific antenna port is arranged in a staggered configuration, redundant description shall be omitted but unique items of the CSI-RS pattern shown in FIG. 17 will be explained in the following description.

Comparing to the case that CSI-RS for a specific antenna port is situated on the same OFDM symbol [FIG. 15], if CSI-RS for a specific antenna port is arranged on different OFDM symbols [FIG. 17], better channel measurement performance can be provided to a channel having a large delay spread.

The CSI-RS pattern shown in FIG. 17 may be useful if CSI-RSs for some antenna ports are used only. For instance, in case of the CSI-RS pattern shown in FIG. 15, when CSI-RSs for maximum 2 antenna ports are transmitted, the number of REs having CSI-RS arranged thereon per OFDM symbol becomes 2 or 4. On the other hand, according to the CSI-RS pattern shown in FIG. 17 or the like, when CSI-RSs for maximum 2 antenna ports are transmitted, the number of REs having CSI-RS arranged thereon per OFDM symbol is decremented to 1 or 21. Hence, the number of REs having a reference signal arranged thereon is incremented, whereby power boosting effect of CSI-RS for aggressive channel measurement or system performance improvement can be provided.

Figure 18:
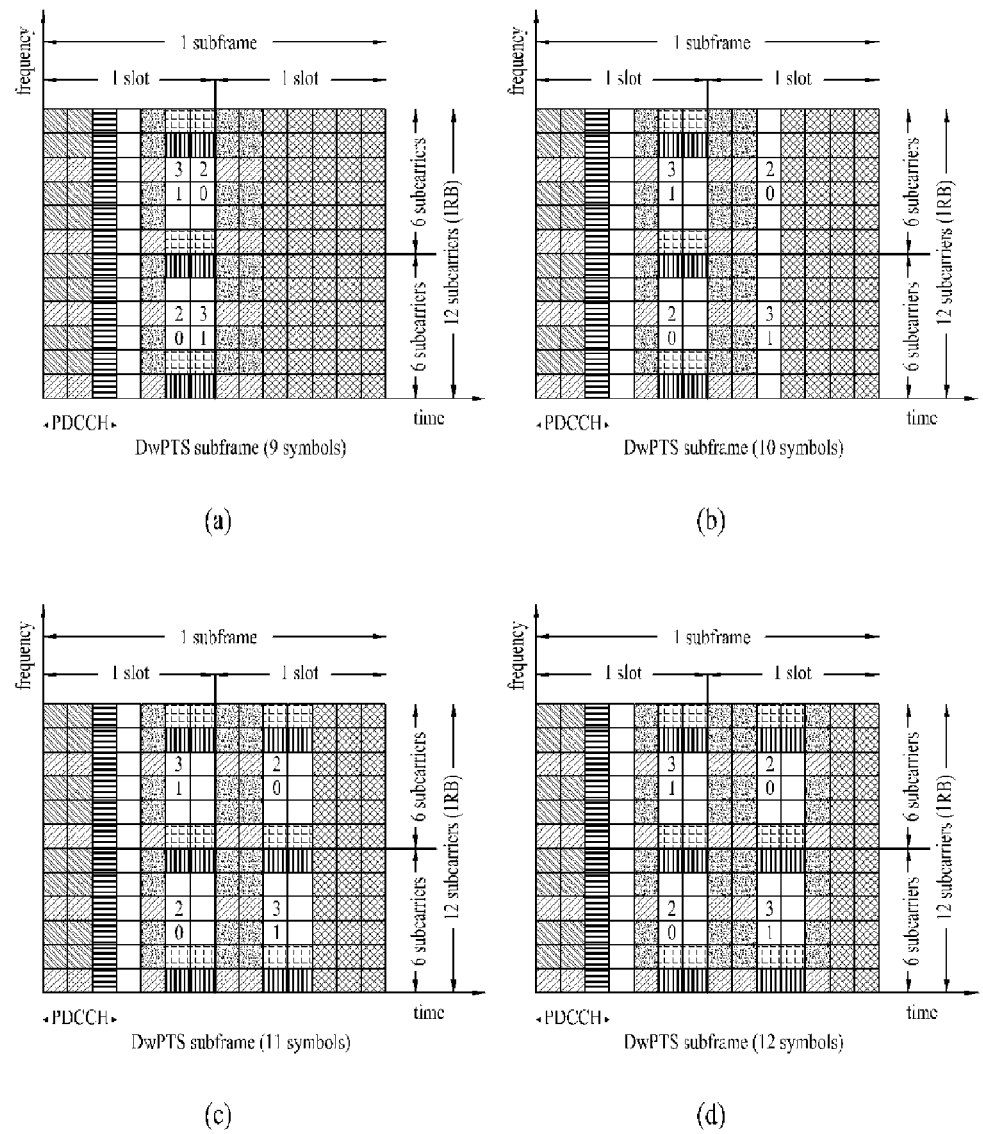

FIG. 18 shows a modified example of CSI-RS according to the number of available OFDM symbols in a special subframe based on the CSI-RS pattern in a normal subframe shown in FIG. 17 or the like. The CSI-RS pattern shown in FIG. 18 may be described as a T-shifted version of the CSI-RS pattern shown in FIG. 17. since the CSI-RS pattern shown in FIG. 18 has features similar to those of the CSI-RS pattern shown in FIG. 16 except that CSI-RS for a specific antenna port is arranged in a staggered configuration, redundant description will be omitted.

In the above-mentioned descriptions with reference to FIGS. 15 to 18, CSI-RS is arranged on 2 OFDM symbols in one subframe. In this CSI-RS pattern, it may be advantageous in the above-mentioned channel measurement. Yet, in another viewpoint, power for the channel measurement may be insufficient or performance degradation may occur in the conventional LTE system (e.g., Release-8) for which CSI-RS is not defined. As a space for arranging CSI-RS in frequency domain is insufficient, limitation may be put on designing a CSI-RS pattern of V-shifted type, thereby having difficulty in providing sufficient adaptability of the CSI-RS pattern. Therefore, it may be able to consider a CSI-RS pattern of a new type.

Figure 19:
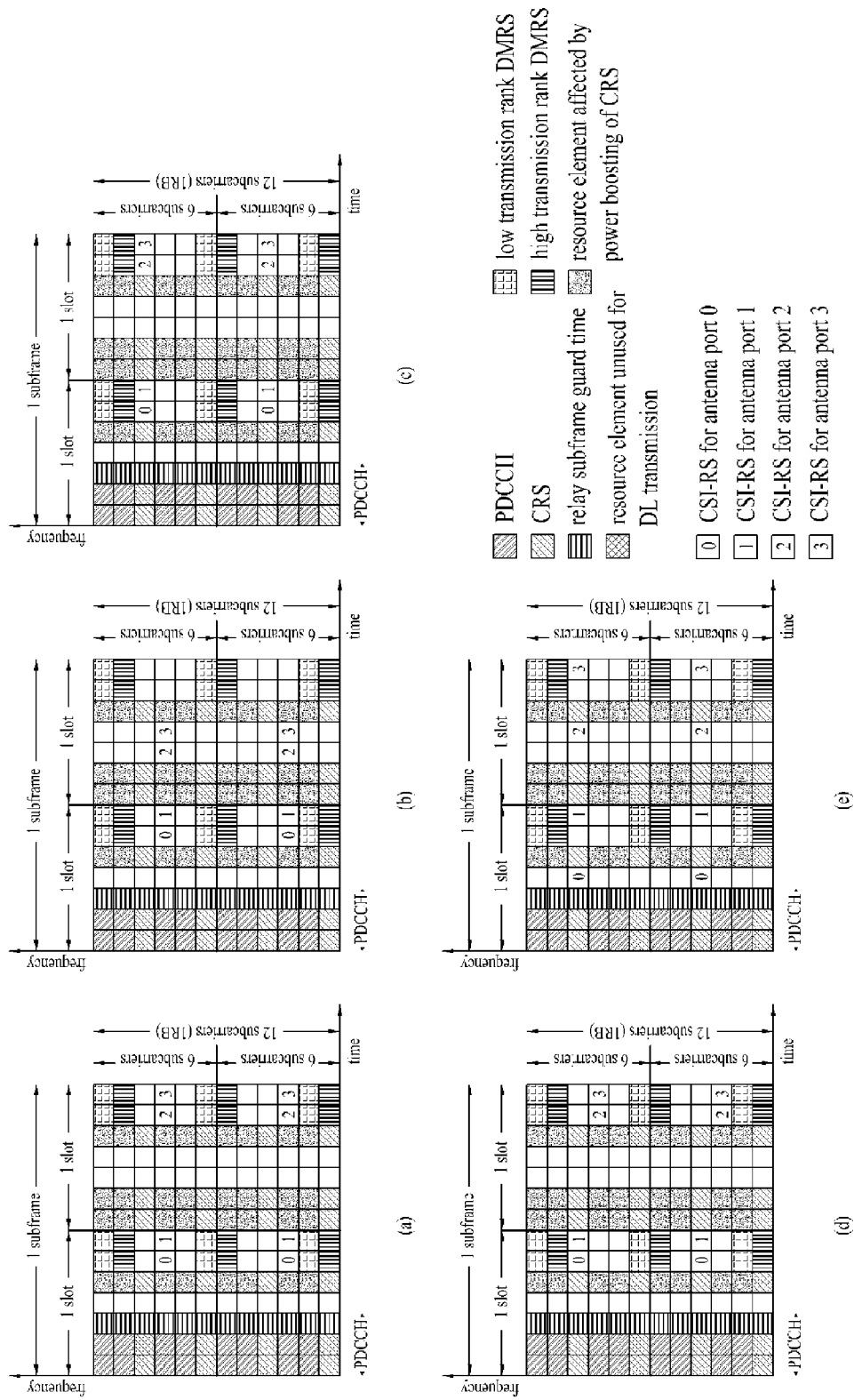
Figure 20:
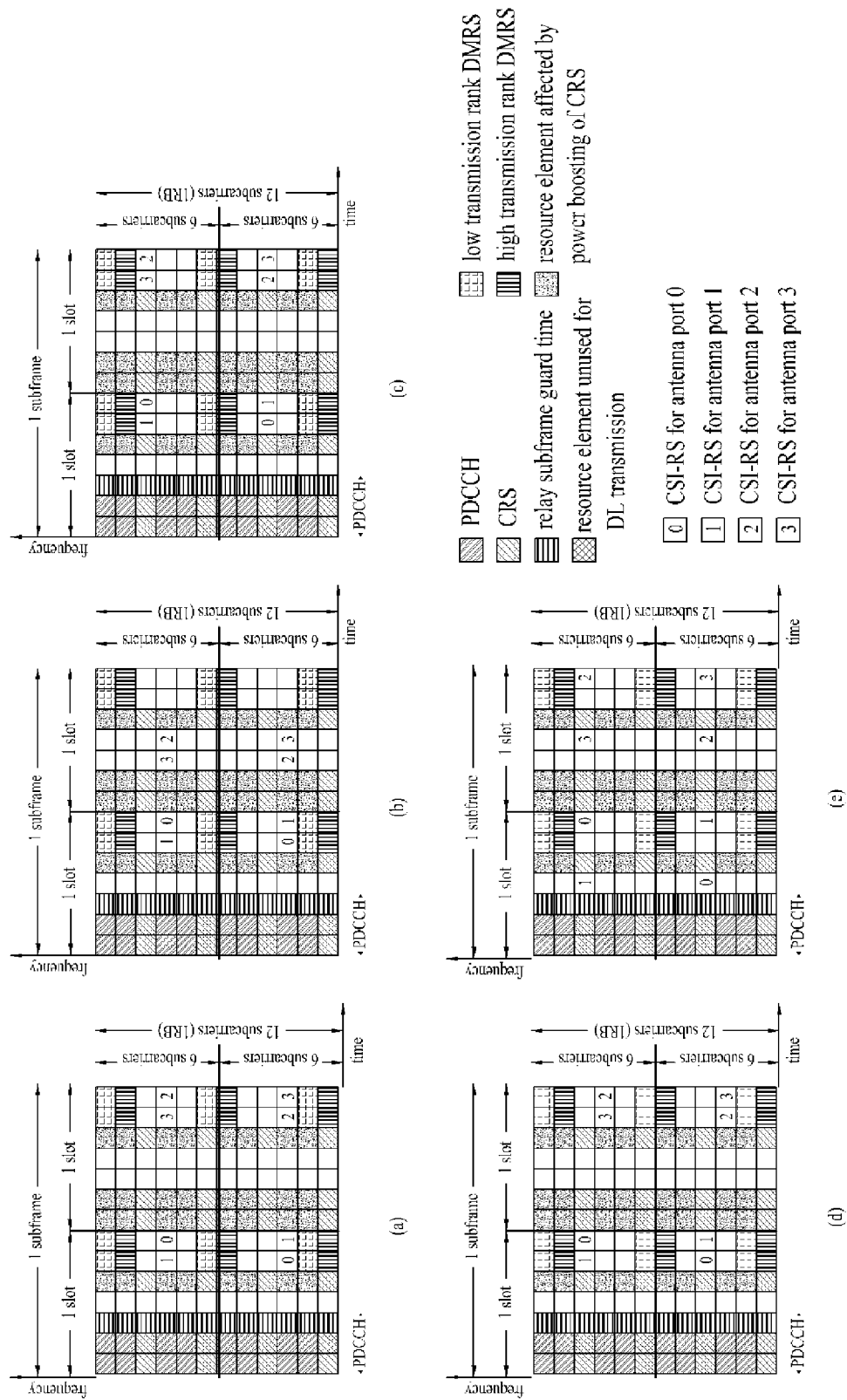
Figure 21:
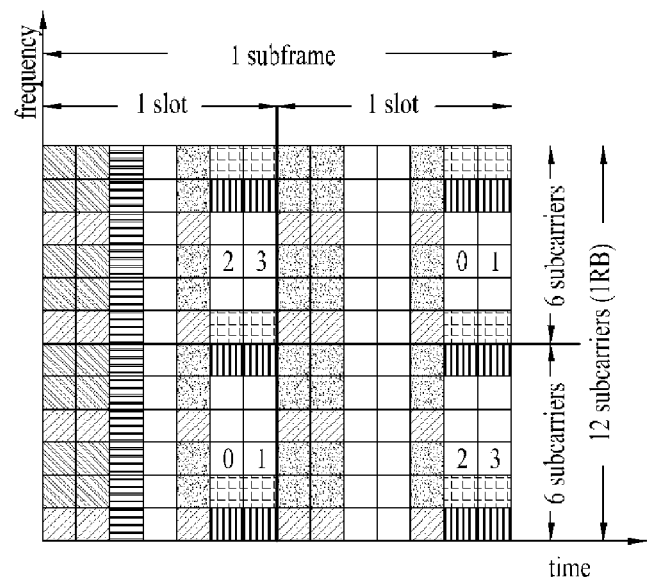
Figure 21:
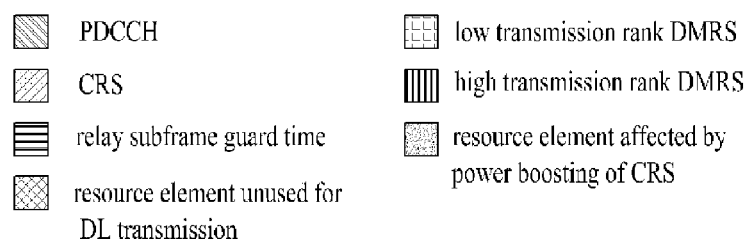

FIGS. 19 to 21 show patterns for arranging CSI-RS on 4 OFDM symbols in one subframe.

CSI-RS pattern shown in FIG. 19 is described as follows. First of all, CSI-RS pattern shown in FIG. 19 (a) may be defined as a basic pattern for arranging CSI-RS on 4 OFDM symbols. CSI-RS pattern shown in FIG. 19 (b) may be described as a version of T-shifting a portion of the basic pattern shown in FIG. 19 (a). CSI-RS pattern shown in FIG. 19 (c) may be described as a version of V-shifting CSI-RS for all antenna ports of the basic pattern shown in FIG. 19 (a). CSI-RS pattern shown in FIG. 19 (d) may be described as a version of V-shifting CSI-RS for some antenna ports 0 and 1 of the basic pattern shown in FIG. 19 (a). CSI-RS pattern shown in FIG. 19 (e) may be described as a version of applying V-shift for all antenna ports of the basic pattern shown in FIG. 19 (a) and applying T-shift for some antenna ports 0 and 2 of the basic pattern shown in FIG. 19 (a). FIG. 19 shows several examples of V-shift and T-shift of the CSI-RS pattern, by which the CSI-RS pattern may be non-limited. In particular, various combinations of V-shift and T-shift may be applicable to CSI-RS pattern under the restriction condition (e.g., restriction on use of time resource and/or frequency resource) in accordance with CoMP operation or subframe type.

FIG. 20 shows a pattern in which CSI-RS positions are arranged in a manner of being staggered per antenna port. Since CSI-RS pattern shown in FIG. 20 has the features similar to those of the former CSI-RS pattern shown in FIG. 19 except that CSI-RS for a specific antenna port is arranged in a staggered configuration, redundant description will be omitted. According to the CSI-RS pattern having the staggered configuration, as shown in FIG. 20, in case that a channel has a large delay spread or that CSI-RS for some antenna port is used only, this pattern may be able to provide channel measurement performance better than that of CSI-RS pattern arranged without the staggered configuration. Moreover, FIG. 20 (a) to FIG. 20 (d) show V-shifted and/or T-shifted versions in the same manners shown in FIG. 19 (a) to FIG. 19 (e), respectively. And, various combinations of V-shift and T-shift may be further applicable to CSI-RS pattern.

FIG. 21 shows a pattern in which CSI-RSs are arranged per antenna port group in staggered configuration. CSI-RS pattern shown in FIG. 21 may be defined as the basic CSI-RS pattern shown in FIG. 19 (a) or FIG. 20 (a). And, it may be able to use CSI-RS patterns generated from applying various V-shifts and/or T-shifts to the basic CSI-RS pattern. The CSI-RS pattern shown in FIG. 21 may be useful if antenna ports in one subframe are used in part only. In particular, the number of cases increases and a more efficient boosting effect may be provided.

5$^{th}$ Embodiment-2

5$^{th}$ embodiment-2 relates to an example of CSI-RS pattern in case of an extended CP. In designing CSI-RS pattern, it may be necessary to consider CRS and DMRS patterns. In case of an extended CP, patterns of CRS and DMRS in a normal subframe are described with reference to the former example shown in FIG. 9 (b), by which the CRS and DMRS patterns may be non-limited. Moreover, the following principle of designing CSI-RS pattern according to the present invention may apply to CRS and DMRS patterns in other configurations.

In designing CSI-RS pattern, CSI-RS may be set not to be arranged on CRS-arranged OFDM symbol, PDCCH region or a guard time region of a relay subframe. Hence, CSI-RS may be arranged on 5 OFDM symbols (e.g., 5$^{th}$, 6$^{th}$, 9$^{th}$, 11$^{th}$ and 12$^{th}$ OFDM symbols) in one resource block (e.g., 12 OFDM symbols×12 subcarriers).

Figure 22:
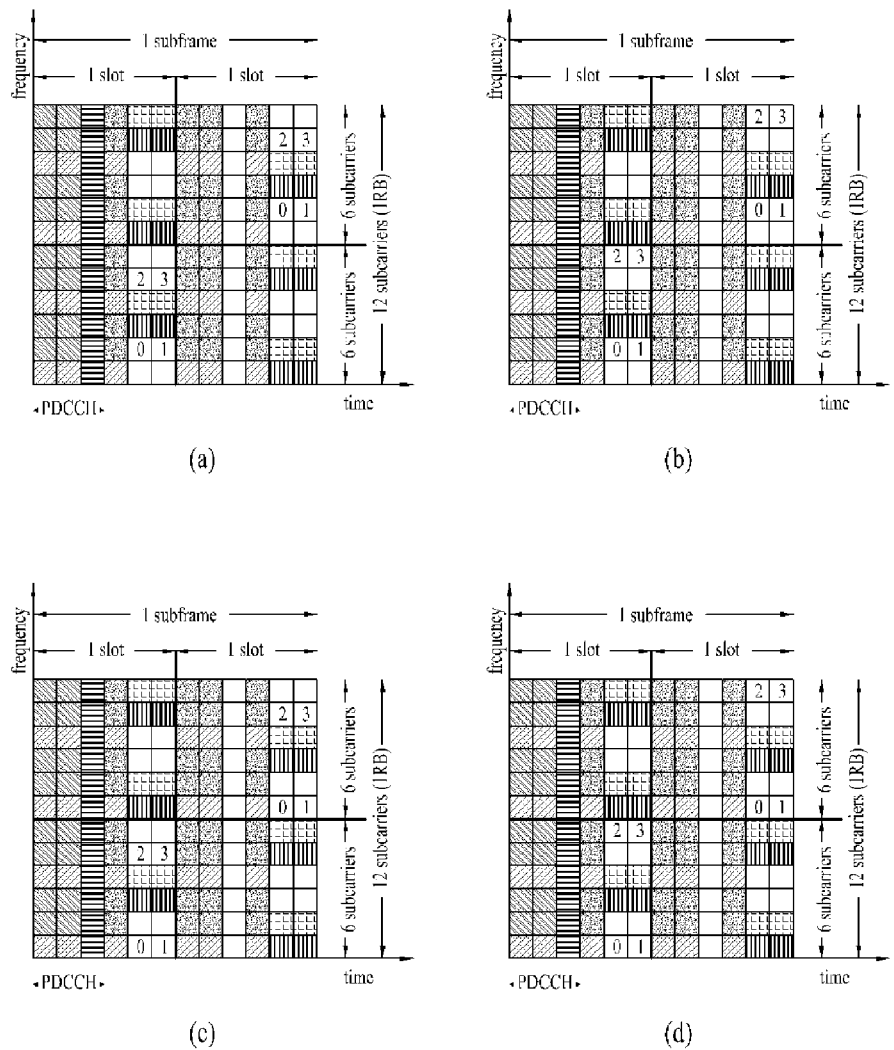
FIGS. 22 to 29 are diagrams for examples of CSI-RS pattern according to another embodiment of the present invention.

FIG. 22 shows examples of CSI-RS pattern according to the above settings. In FIG. 22, REs indicated by 0, 1, 2 and 3 indicate REs to which CSI-RSs for antenna port indexes 0, 1, 2 and 3 are allocated, respectively.

Referring to FIG. 22, in case of an extended CP, the following restriction on a design exists due to an inter-DMRS interval in frequency domain. Namely, it may be impossible to design two CSI-RSs per antenna port to be arranged on one OFDM symbol in 6-subcarrier interval. Hence, it may be able to design two CSI-RSs per antenna port to be arranged on different OFDM symbols.

FIG. 22 (a) shows a pattern in which CSI-RS is arranged on 4 OFDM symbols in one subframe in consideration of the above restriction. And, this pattern may be defined as a basic pattern. CSI-RS patterns shown in FIG. 22 (b) to FIG. 22 (d) indicate examples of applying V-shift to the former pattern shown in FIG. 22 (a).

Figure 23:
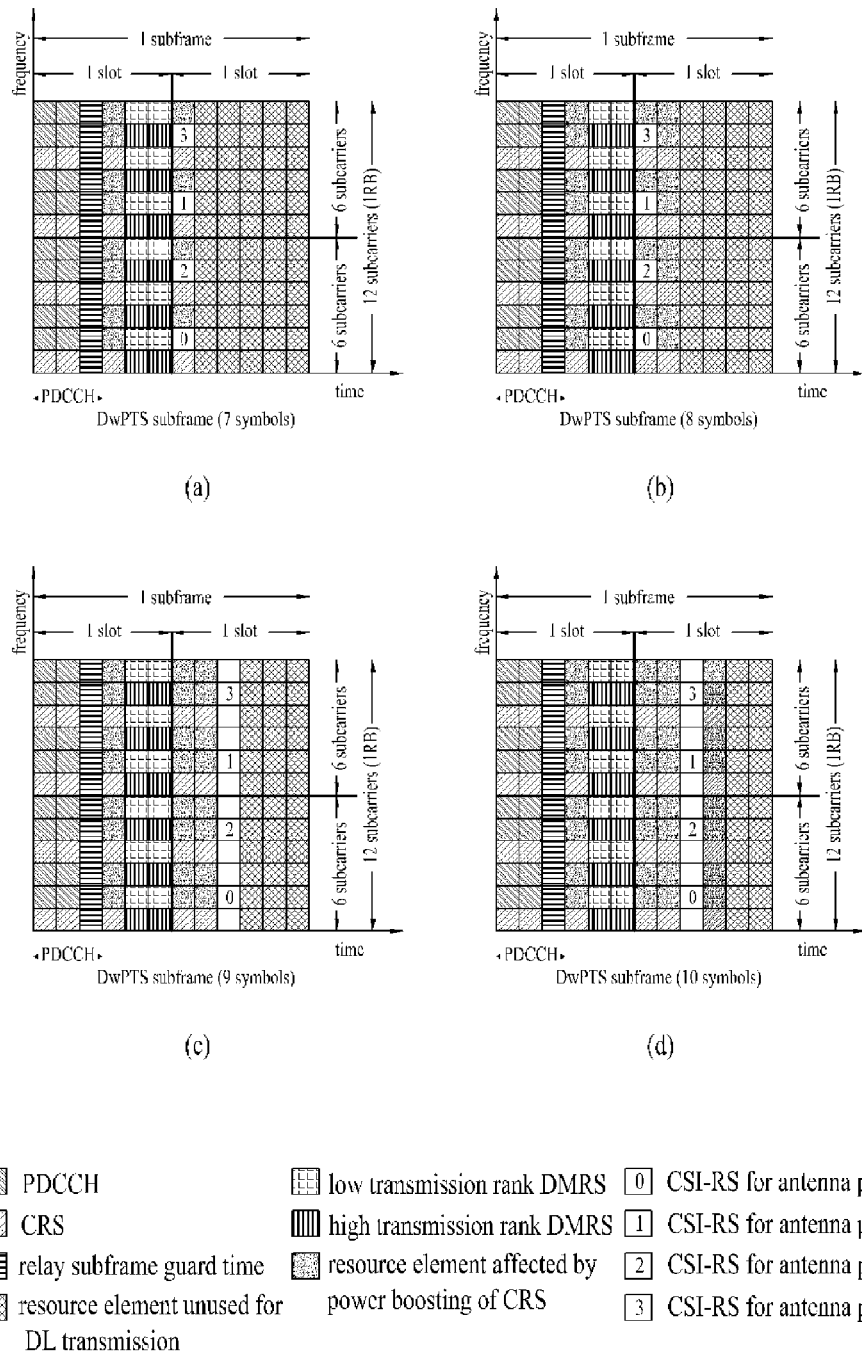

Meanwhile, FIG. 23 shows CSI-RS pattern in a special subframe having an extended CP structure. CRS and DMRS patterns shown in FIG. 23 (a) to FIG. 23 (d) follow the examples shown in FIG. 12 (a) to FIG. 12 (d) and show CSI-RS patterns in corresponding cases, respectively, by which the CRS and DMRS patterns may be non-limited. Moreover, the following principle of designing CSI-RS pattern according to the present invention may apply to CRS and DMRS patterns in other configurations.

Referring to FIG. 23, in order to support CSI-RS transmission in a special subframe, based on the basic pattern having CSI-RS arranged on 4 OFDM symbols in FIG. 22 (a), it may be able to shift CSI-RS to be arranged on symbol(s) less than 4 OFDM symbols. In this case, it may be able to design one CSI-RS to be transmitted via one antenna port each.

In accordance with the number of available OFDM symbols in a special subframe, CSI-RS pattern may vary. FIG. 23 (a) to FIG. 23 (d) show CSI-RS patterns if the available OFDM symbol numbers are 7, 8, 9 and 10, respectively.

In the CSI-RS patterns shown in FIG. 23 (a) and FIG. 23 (b), it may not apply the rule of not arranging CSI-RS on the CRS arranged OFDM symbol according to the above-mentioned CSI-RS arrangement rules. This is because there is no OFDM symbol free from CRS or DMRS in the number of the available OFDM symbols is 7 or 8. Hence, it may be able to design CSI-RS to be arranged on the 4$^{th}$ or 7$^{th}$ OFDM symbols having the CRS exist therein. FIG. 23 (a) or FIG. 23 (b) shows a pattern in which CSI-RSs are arranged at 4 REs spaced apart from each other by 2 subcarriers on 7$^{th}$ OFDM symbol. Referring to FIG. 23, the CSI-RSs are arranged in order of antenna port indexes 3, 1, 2 and 0, by which the CSI-RS arrangement is non-limited. In case of a fall-back from a special subframe to a normal subframe, referring to FIG. 23 (a) or FIG. 23 (b), CSI-RSs concentrated on one OFDM symbol can be distributed to 4 OFDM symbols [cf. FIG. 22 (a)].

Referring to FIG. 23 (c) and FIG. 23 (d), CSI-RS may be arranged on 9$^{th}$ OFDM symbol having no CRS or DMRS exist therein.

Figure 24:
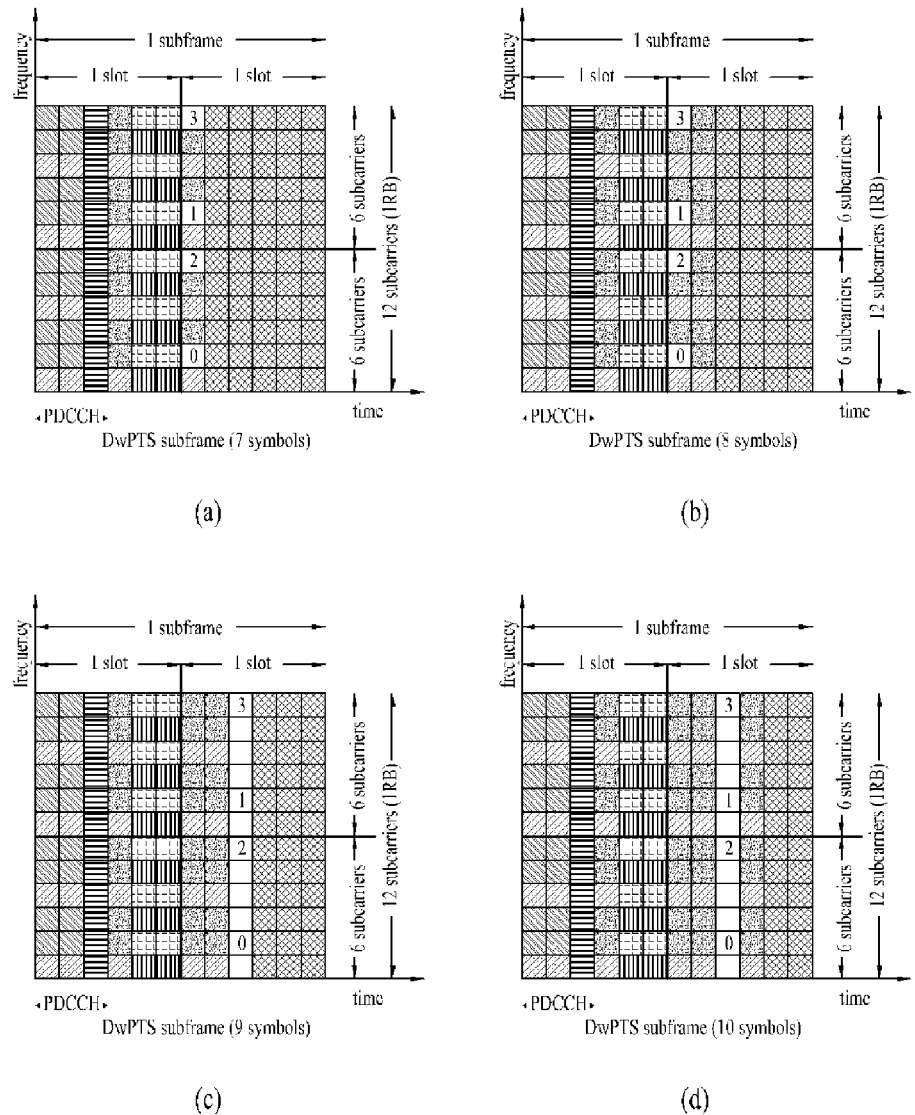

CSI-RS patterns shown in FIG. 24 (a) to FIG. 24 (d) may be described as some antenna port groups 2 and 3 of the CSI-RS patterns shown in FIG. 23 (a) to FIG. 23 (d) are V-shifted. In case of a fall-back from a special subframe to a normal subframe, referring to FIG. 24 (a) or FIG. 24 (b), CSI-RSs concentrated on one OFDM symbol can be distributed to 4 OFDM symbols [cf. FIG. 22 (b)]. Other matters for the CSI-RS patterns shown in FIG. 24 are as good as those described with reference to FIG. 23 and may be omitted from the following description for clarity.

Figure 25:
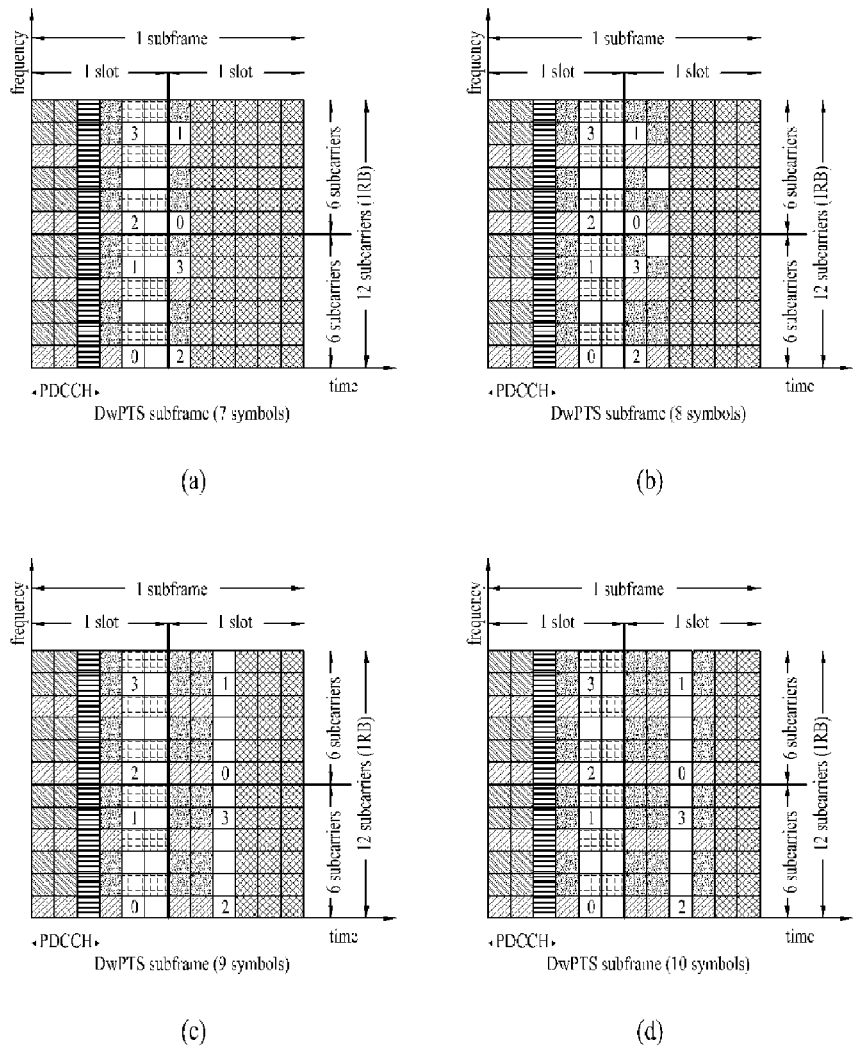
Figure 26:
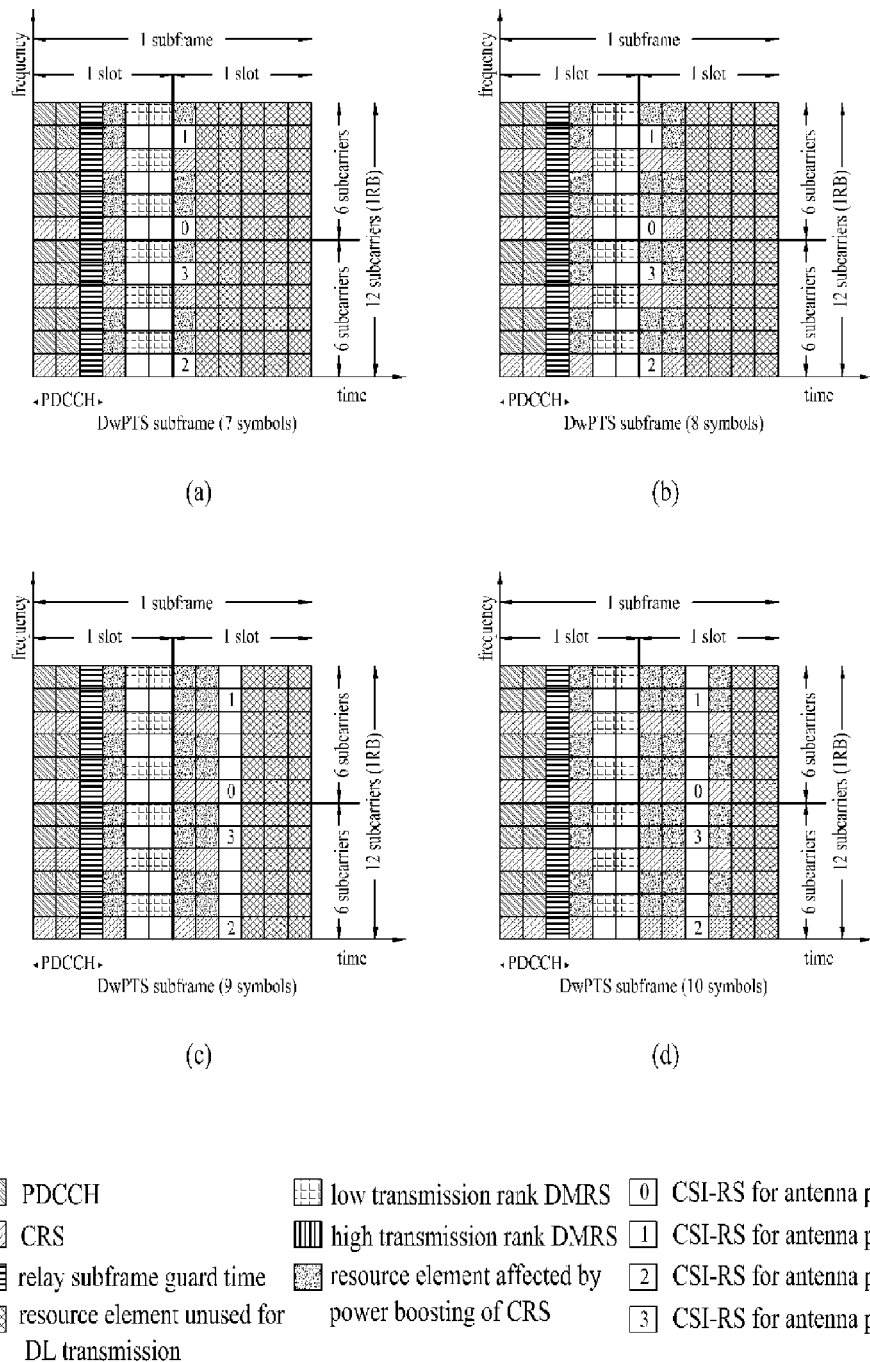

In order to increase the number of REs on which data or CSI-RS can be arranged, it may be able to consider a case that the number of REs carrying DMRS in a special subframe is set small. In particular, when CRS and DMRS having the pattern described with reference to FIG. 14 (a) are transmitted in a subframe having a configuration of an extended CP, a pattern for arranging CSI-RS may be set as shown in FIG. 25 or FIG. 26. FIG. 25 shows a pattern in which CSI-RSs are arranged on total 8 REs on 2 OFDM symbols. And, FIG. 26 shows a pattern in which CSI-RSs are arranged on 4 REs on 1 OFDM symbol.

FIG. 25 (a) to FIG. 25 (d) show CSI-RS patterns if the numbers of available OFDM symbols in a special subframe including DwPTS are 7, 8, 9 and 10, respectively. If the number of available OFDM symbols is 7/8 [FIG. 25 (a)/FIG. 25 (b)], CSI-RSs may be arranged on $5^{th}$ and $7^{th}$ OFDM symbols, on which DMRSs are arranged, respectively. When the CSI-RS is arranged on the $7^{th}$ OFDM symbol, some of CRSs (e.g., CRS for antenna port index 0) may be restricted from being transmitted. Meanwhile, if the number of available OFDM symbols is 9/10 [FIG. 25 (c)/FIG. 25 (d)], CSI-RSs may be arranged on $5^{th}$ OFDM symbol having DMRS arranged thereon and $9^{th}$ OFDM symbol having another reference signal not arranged thereon, respectively.

FIG. 26 (a) to FIG. 26 (d) show CSI-RS patterns if the numbers of available OFDM symbols in a special subframe including DwPTS are 7, 8, 9 and 10, respectively. If the number of available OFDM symbols is 7/8 [FIG. 26 (a)/FIG. 26 (b)], CSI-RS may be arranged on $7^{th}$ OFDM symbol, on which CRS is arranged. When the CSI-RS is arranged on the $7^{th}$ OFDM symbol, some of CRSs (e.g., CRS for antenna port index 0) may be restricted from being transmitted. Meanwhile, if the number of available OFDM symbols is 9/10 [FIG. 26 (c)/FIG. 26 (d)], CSI-RS may be arranged on $9^{th}$ OFDM symbol having another reference signal not arranged thereon.

In the above description, mainly explained is CSI-RS pattern in which 2 CSI-RSs per antenna port are arranged with an interval of 6 REs. Yet, in case of a large delay spread, in order to compensate for the large delay spread, more CSI-RSs need to be transmitted for each antenna port. In this case, as the number CSI-RS carrying REs increases, performance loss may be caused to a user equipment due to LTE Release-8 system. In order to prevent this performance loss, CSI-RS for antenna ports more than 2 may be restricted from being transmitted. In consideration of this fact, FIGS. 27 to 29 show examples of a pattern in which CSI-RSs for 2 antenna ports (e.g., antenna port index 0 and antenna port index 1) are mapped.

Figure 27:
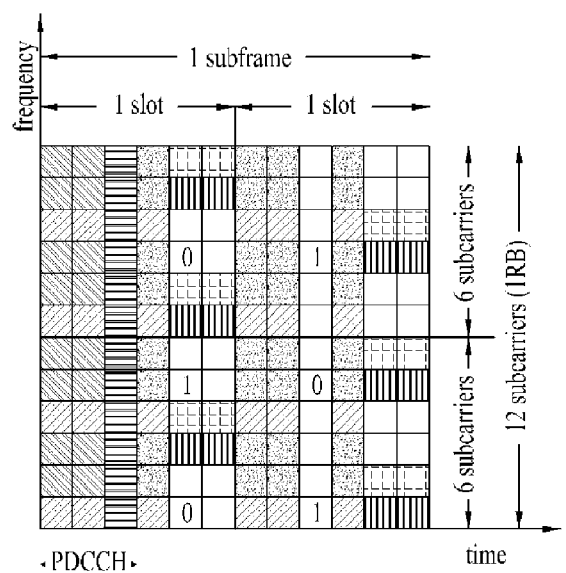
Figure 27:
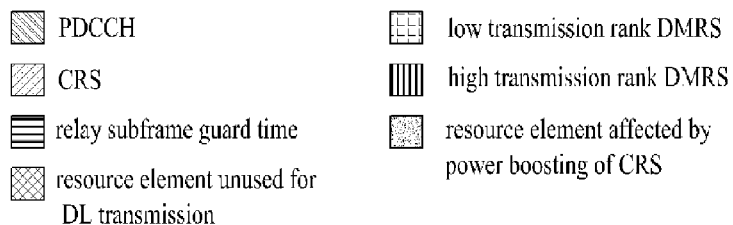

FIG. 27 shows one example of a pattern, in which CSI-RSs for 2 antenna ports are arranged with 4-RE interval in frequency domain, in a normal subframe in case of an extended CP. CRS and DMRS patterns shown in FIG. 27 are represented to have the same configuration shown in FIG. 9 (b), by which the CRS and DMRS patterns may be non-limited.

Figure 28:
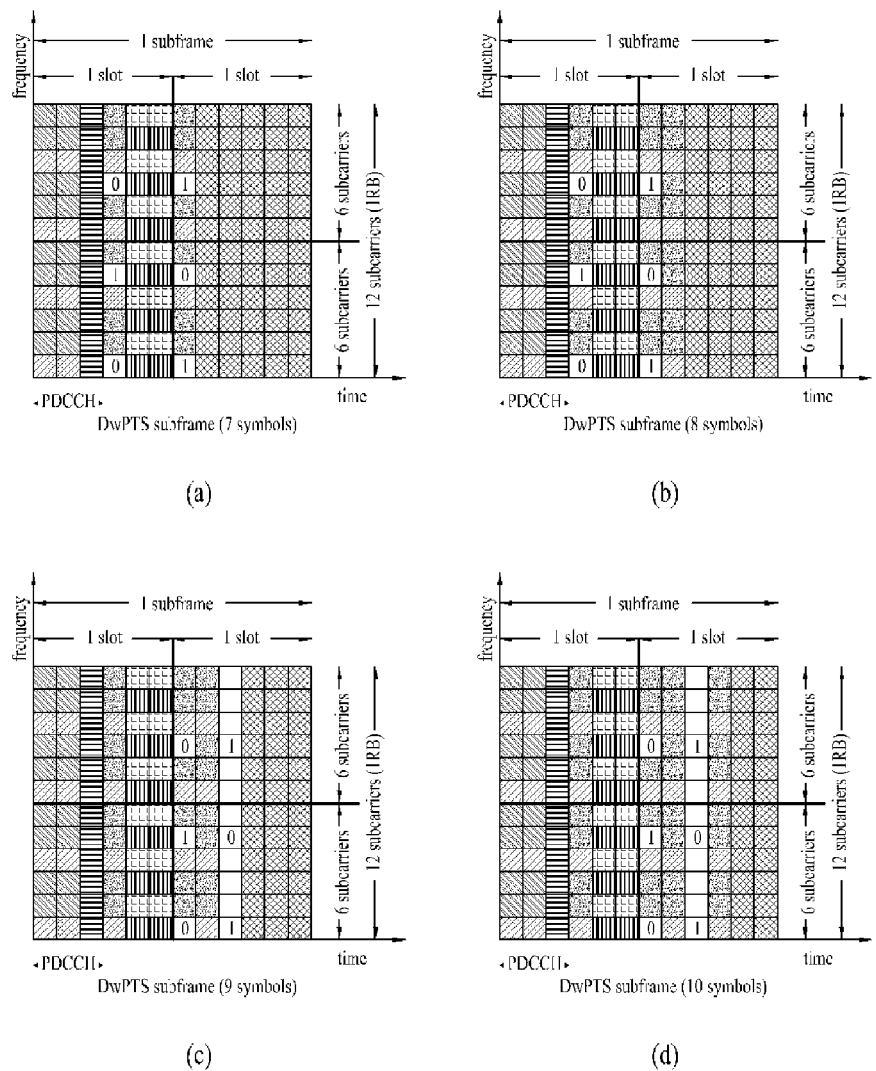
Figure 29:
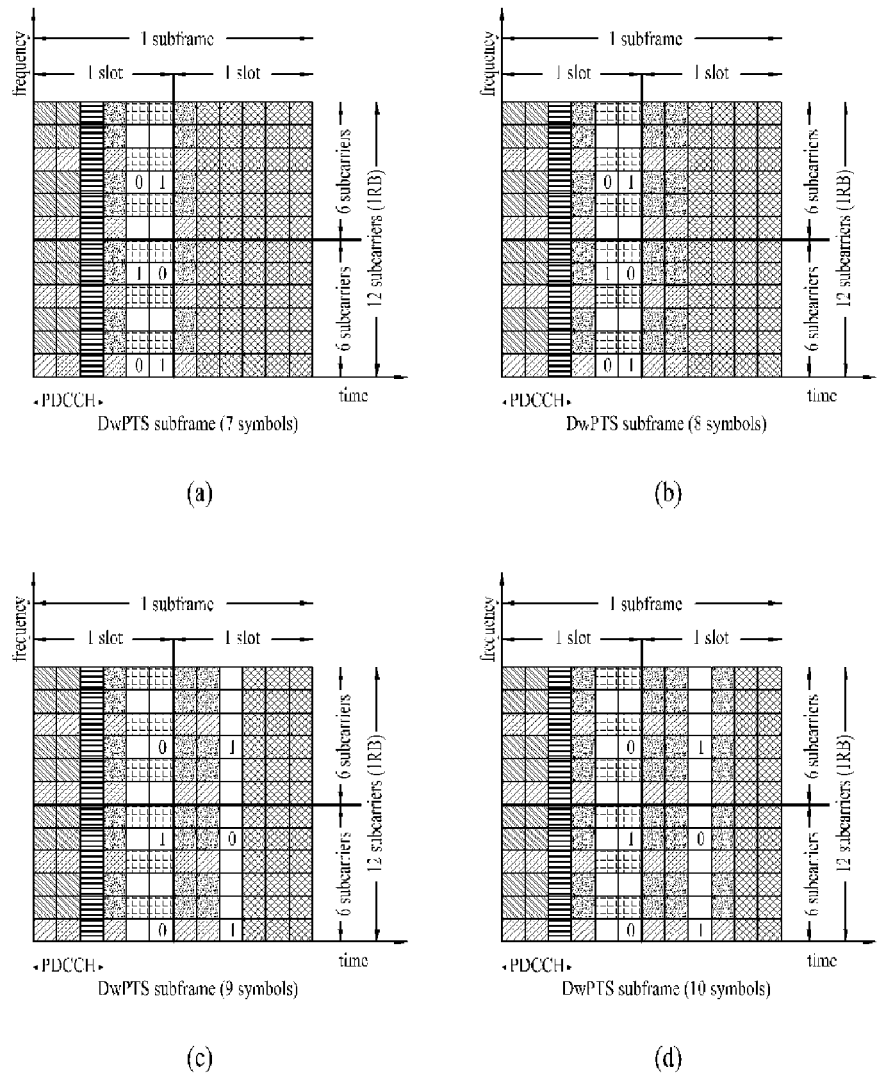

According to the CSI-RS pattern shown in FIG. 28 or FIG. 29, CSI-RS position shown in FIG. 27 is T-shifted.

FIG. 28 shows one example of a pattern, in which CSI-RSs for 2 antenna ports are arranged with 4-RE interval in frequency domain, in a special subframe in case of an extended CP. FIG. 28 (a) to FIG. 28 (d) show cases that the number of available OFDM symbols are 7, 8, 9 and 10, respectively. CRS and DMRS patterns shown in FIG. 28 are represented as having the configuration shown in FIG. 12, by which the CRS and DMRS patterns may be non-limited. Meanwhile, in arranging CSI-RSs on $4^{th}$ and $7^{th}$ OFDM symbols, respectively, some of CRSs (e.g., CRS for antenna port index 0, CRS for antenna port index 1, etc.) may be restricted from being transmitted.

FIG. 29 shows one example of a pattern, in which CSI-RSs for 2 antenna ports are arranged with 4-RE interval in frequency domain, in a special subframe in case of an extended CP. FIG. 29 (a) to FIG. 29 (d) show cases that the number of available OFDM symbols are 7, 8, 9 and 10, respectively. Compared to the former CSI-RS pattern shown in FIG. 28, CSI-RS pattern shown in FIG. 29 relates to a case [e.g., CRS and DMRS patterns shown in FIG. 14 (a)] that that the number of REs carrying DMRS is relatively smaller. In particular, if it is difficult to transmit CSI-RS due to such a problem as insufficient resource for carrying data, power boosting of CRS and the like in the case shown in FIG. 28, a transmission rank in a special subframe may be limited to a specific value (e.g., 2) in the case shown in FIG. 29. Hence, CSI-RS may be arranged on a DMRS located OFDM symbol or an OFDM symbol having no other reference signal arranged thereon.

$5^{th}$ Embodiment-3

Unlike the above-mentioned $5^{th}$ embodiment-2, $5^{th}$ embodiment-3 may partially eliminate the restriction on CSI-RS pattern in accordance with another example (e.g., DMRS pattern shown in FIG. 10) of DMRS pattern in a subframe having a structure of an extended CP. In particular, two CSI-RSs per antenna port may be arranged on one OFDM symbol.

Figure 30:
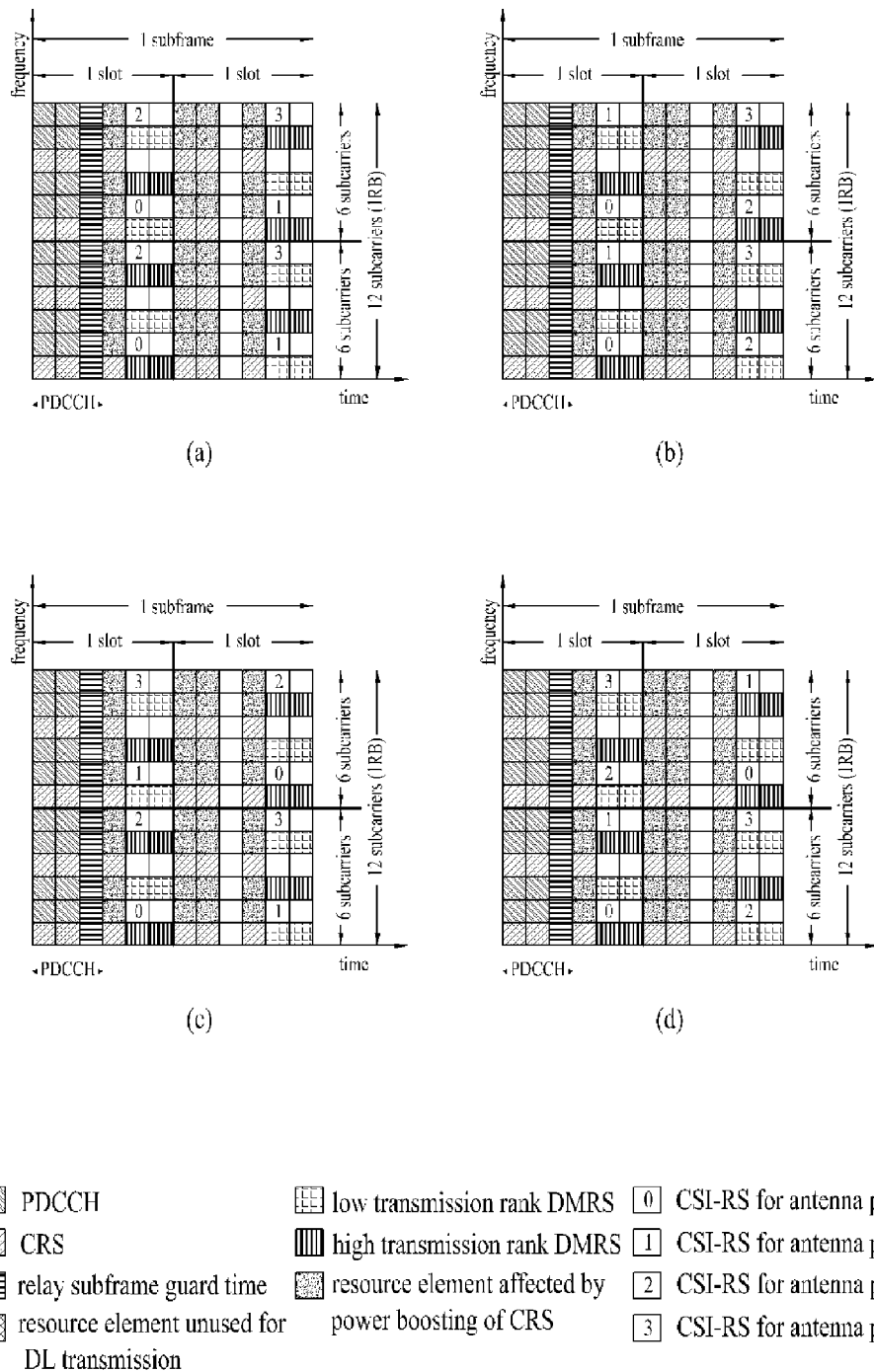
FIGS. 30 to 35 are diagrams for examples of CSI-RS pattern according to further embodiment of the present invention.

FIG. 30 shows various examples of CSI-RS pattern in accordance with a new DMRS pattern in a normal subframe having an extended CP structure. In FIG. 30 (a) to FIG. 30 (d), CSI-RS arranged OFDM symbols identically include $5^{th}$ and $11^{th}$ OFDM symbols but positions of the CSI-RSs for antenna ports are different. In FIG. 30 (a) and FIG. 30 (b), 2 CSI-RSs for one antenna port are arranged on one OFDM symbol with an interval of 6 REs. In FIG. 30 (c) and FIG. 30 (d), 2 CSI-RSs for one antenna port are arranged on different OFDM symbols with an interval of 6 REs. In case that a transmission rank is restricted up to 2 antenna ports (e.g., antenna port index 0 and antenna port index 1), the CSI-RS pattern shown in FIG. 30 (b) shows one example that REs carrying CSI-RSs are concentrated on one OFDM symbol. Meanwhile, in the examples of the CSI-RS pattern shown in FIG. 30 (a) to FIG. 30 (c), REs carrying CSI-RSs for 2 antenna ports (e.g., antenna port index 0 and antenna port index 1) are distributed across 2 OFDM symbols.

To the CSI-RS pattern shown in FIG. 30, V-shift and/or T-shift may be applied in a manner that CSI-RSs are distributively arranged on 4 OFDM symbols.

Figure 31:
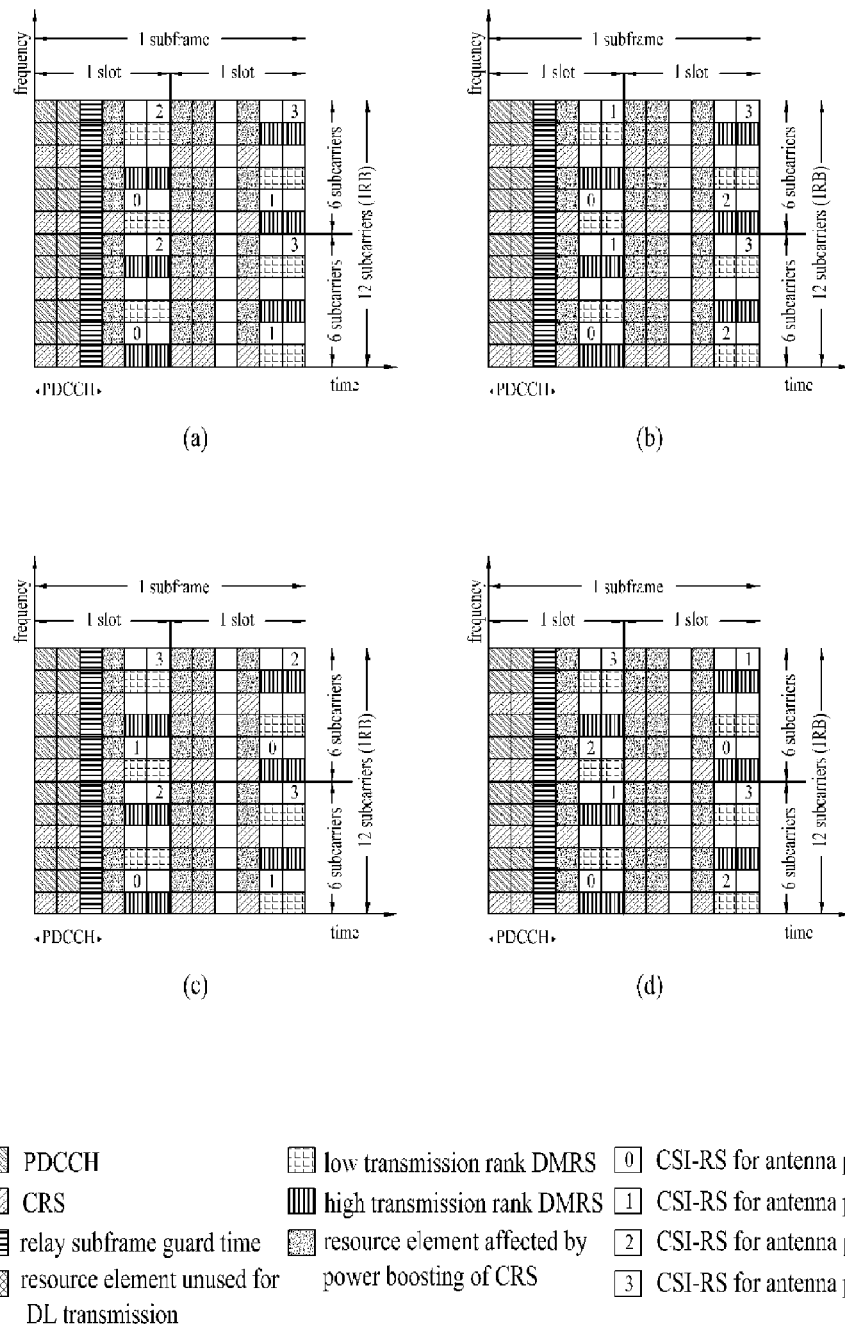

FIG. 31 (a) to FIG. 31 (d) show examples of distributively arranging CSI-RSs for 4 antenna ports on 4 OFDM symbols in a manner of T-shifting CSI-RS carrying REs for some antenna ports of the CSI-RS patterns shown in FIG. 30 (a) to FIG. 30 (d), respectively.

Figure 32:
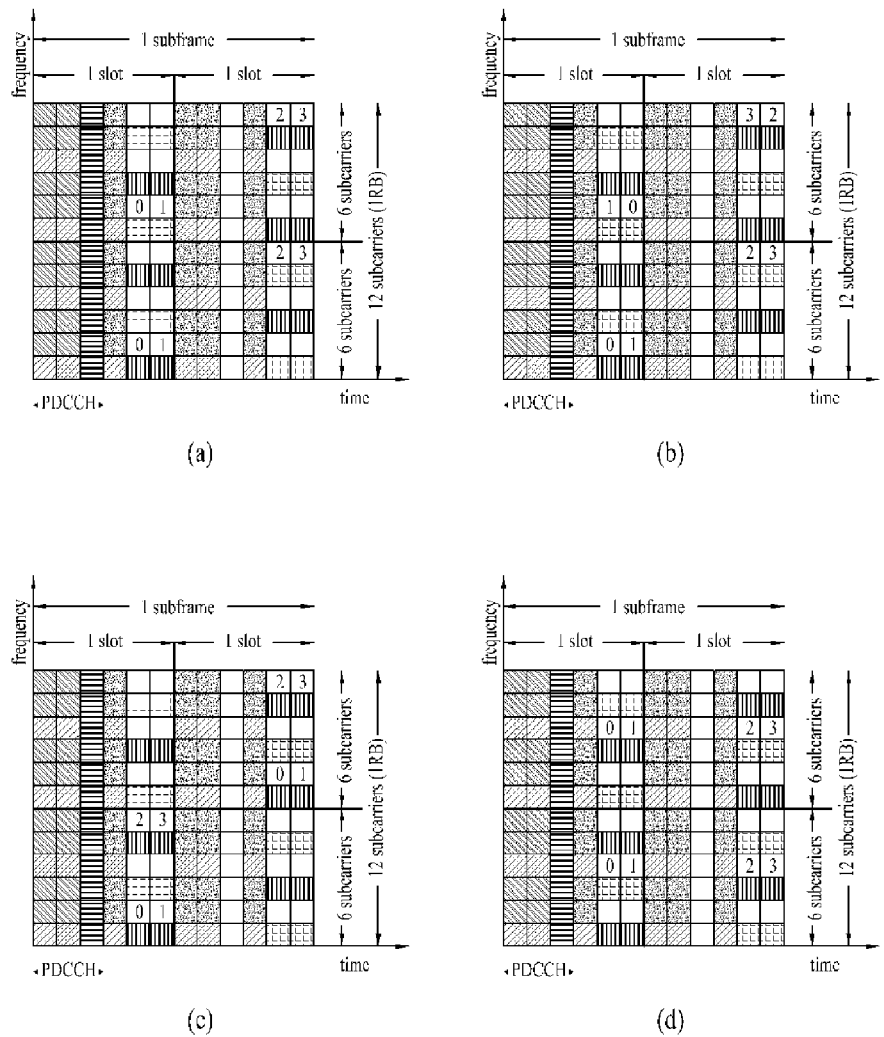

FIG. 32 shows another example of distributively arranging CSI-RSs for 4 antenna ports on 4 OFDM symbols. Referring to FIG. 32 (a), in order to avoid arranging CSI-RS at RE position that needs power boosting for another reference signal, it may be useful to distributively arrange CSI-RS on at least 2 OFDM symbols basically. FIG. 32 (b) shows CSI-RS pattern in which 2 CSI-RSs per antenna port are arranged to be staggered in time domain. In this case, strong channel measurement may be achieved. FIG. 32 (c) and FIG. 32 (d) show examples of V-shifted/T-shifted CSI-RS pattern.

In the following description, explained is CSI-RS pattern in case of restricting the number of available OFDM symbols in a special subframe including DwPTS. CSI-RS pattern in a special subframe may be described as the above-mentioned V-shifted/T-shifted CSI-RS pattern.

Figure 33:
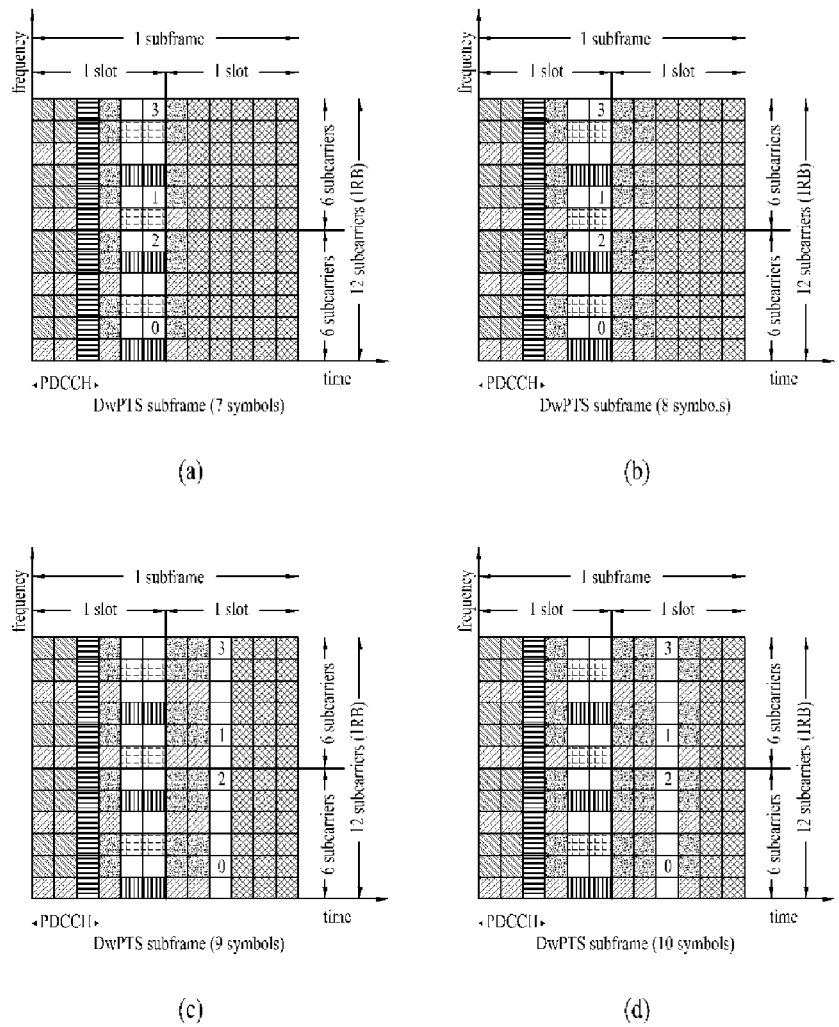

FIG. 33 (a) to FIG. 33 (d) shows examples of arranging CSI-RSs for 4 antenna ports on one OFDM symbol if the numbers of available OFDM symbols are 7, 8, 9 and 10, respectively. If the available OFDM symbol number is 7/8

[FIG. 33 (a)/FIG. 33 (b)], CSI-RS is arranged on $6^{th}$ OFDM symbol. If the available OFDM symbol number is 9/10, CSI-RS is arranged on $9^{th}$ OFDM symbol. In particular, according to the $5^{th}$ embodiment-3, unlike the above-mentioned $5^{th}$ embodiment-2, CSI-RS many be set not to be arranged on a CRS-arranged OFDM symbol in a special subframe. CSI-RS pattern shown in one of FIG. 33 (a) to FIG. 33 (d) falls back to a normal subframe from a special subframe, it may be shifted to a pattern that CSI-RSs are arranged on 4 OFDM symbols shown in FIG. 32 (b) or FIG. 32 (c).

In the above description, mainly explained is CSI-RS pattern in which 2 CSI-RSs per antenna port are arranged with an interval of 6 REs. Yet, in case of a large delay spread, in order to compensate for the large delay spread, more CSI-RSs need to be transmitted for each antenna port. In this case, as the number CSI-RS carrying REs increases, performance loss may be caused to a user equipment due to LTE Release-8 system. In order to prevent this performance loss, CSI-RS for antenna ports more than 2 may be restricted from being transmitted. In consideration of this fact, FIG. 34 and FIG. 35 show examples of a pattern in which CSI-RSs for 2 antenna ports (e.g., antenna port index 0 and antenna port index 1) are mapped.

Figure 34:
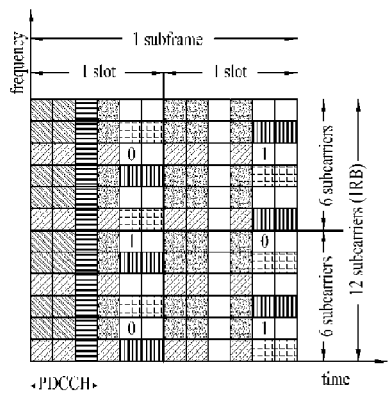
Figure 34:
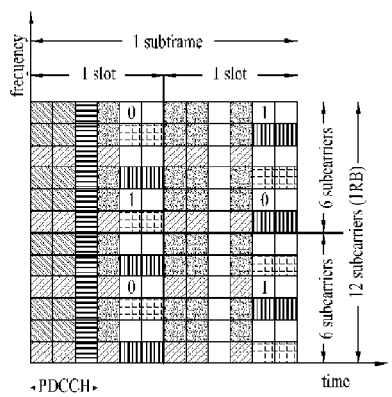

FIG. 34 (a) shows one example of a pattern, in which CSI-RSs for 2 antenna ports are arranged with 4-RE interval in frequency domain, in a normal subframe in case of an extended CP. CSI-RS pattern shown in FIG. 34 (b) may be described as the pattern generated from V-shifting the CSI-RS pattern shown in FIG. 34 (a). Besides, in order to support various operations efficiently, it may be able to use patterns that are T-shifted/V-shifted in other ways.

Figure 35:
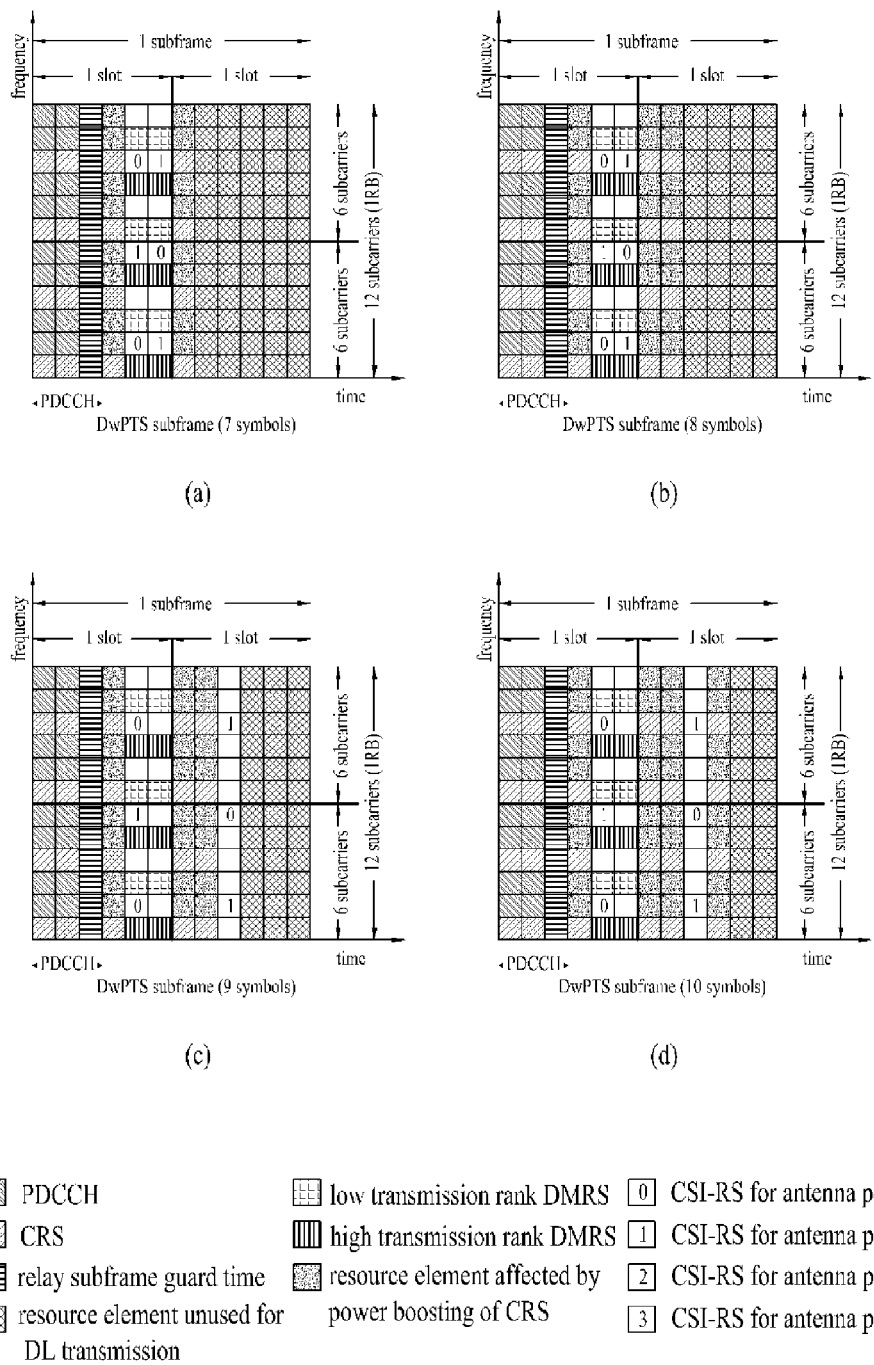

FIG. 35 shows one example of a pattern in which CSI-RSs for 2 antenna ports (e.g., antenna port index 0 and antenna port index 1) are mapped in case of a special subframe. The CSI-RS pattern shown in FIG. 35 may be described as the pattern generated from T-shifting the former CSI-RS pattern shown in FIG. 34 (a).

$5^{th}$ Embodiment-4

$5^{th}$ embodiment-4 relates to a rule of mapping a reference signal to a resource block, which is applicable to various kinds of the above-mentioned embodiments of the present invention.

As mentioned in the foregoing description of Formulas 12 to 14, if CRS and DRS are mapped to a resource block, it may be determined in accordance with such a value as subcarrier index (k), antenna port index (p), the number ($N_{RB}^{DL}$) of allocated resource blocks, slot index ($n_s$) and cell ID ($N_{ID}^{cell}$). In a manner similar to this, a rule of mapping CSI-RS to a resource block may be represented. In particular, a position for mapping CSI-RS to a resource block may be represented as a value such as subcarrier index (k), antenna port index (p), the number ($N_{RB}^{DL}$) of allocated resource blocks, slot index ($n_s$) and cell ($N_{ID}^{cell}$).

In addition, as mentioned in the foregoing description of various embodiments, a position for mapping CSI-RS to a resource block may vary in accordance with a subframe type. In particular, a different CSI-RS pattern may be usable in accordance with a subframe type. For example, the subframe type may include one of a subframe having a normal CP configuration, a subframe having an extended CP configuration, a normal subframe and a special subframe including DwPTS. This CSI-RS pattern may be represented as using a CSI-RS pattern T-shifted and/or V-shifted in accordance with a subframe type. Hence, in order to represent a position for mapping CSI-RS on a resource block (particularly, V-shifted and/or T-shifted value), it may be able to use a subframe index value.

Moreover, as mentioned in the foregoing description of various embodiments, a position for mapping CSI-RS to a resource block may vary per cell. In particular, it may be able to use a non-overlapping CSI-RS pattern per cell. This CSI-RS pattern may be represented as using a CSI-RS pattern V-shifted and/or T-shifted per cell. Hence, in order to represent a position for mapping CSI-RS to a resource block (particularly, V-shift and/or T-shift value), it may be able to use a cell ID value. As CSI-RS position is V-shifted and/or T-shifted per cell, it may be able to support CSI-RS patterns for more cells. This may be represented as an increasing reuse factor. This means that the number of cases for applying CSI-RS pattern per cell differently increases.

A position for mapping CSI-RS to a resource block may vary in accordance with DMRS (or DRS) pattern and may be V-shifted and/or T-shifted in accordance with DMRS position. A position for mapping CSI-RS to a resource block may vary in accordance with a symbol and may be V-shifted and/or T-shifted in accordance with a symbol index. Hence, in order to represent a position for mapping CSI-RS to a resource block (particularly, V-shift and/or T-shift value), it may be able to use a DMRS position index value and/or a symbol index value.

Figure 36:
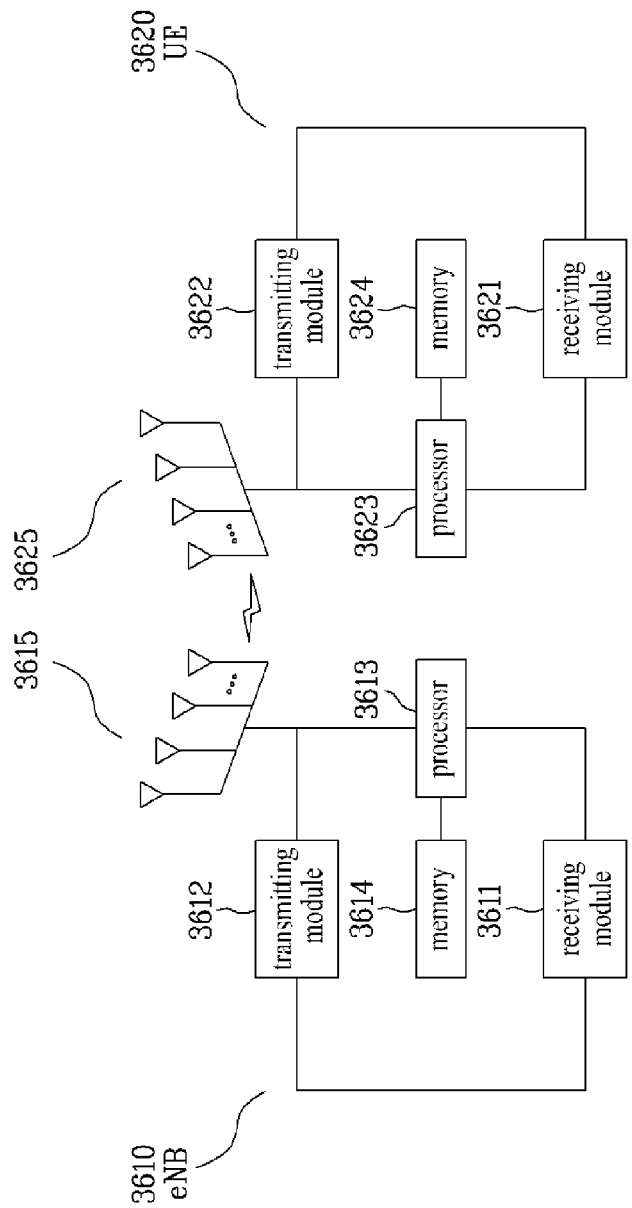
FIG. 36 is a diagram for a configuration of a wireless communication system including a base station device and a user equipment device according to a preferred embodiment of the present invention.

FIG. 36 is a diagram for a configuration of a wireless communication system including a base station device and a user equipment device according to a preferred embodiment of the present invention.

A base station device (eNB) 3610 may include a receiving module 3611, a transmitting module 3612, a processor 3613, a memory 3614 and an antenna 3615. The receiving module 3611 may receive various signals, data, information and the like from a user equipment and the like. The transmitting module 3612 may transmit various signals, data, information and the like to the user equipment and the like. The processor 3613 may be configured to control overall operations of a base station device 3610 including the receiving module 3611, the transmitting module 3612, the memory 3614 and the antenna 3615. And, the antenna 3615 may include a plurality of antennas.

The processor 3613 may control the base station 3610 to transmit channel state information-reference signals (CSI-RSs) for at least two antenna ports. In particular, the processor 3613 may be configured to map the CSI-RSs for the at least 2 antenna ports to a data region of a downlink subframe in accordance with a prescribed pattern. The processor 3613 may be configured to transmit the downlink subframe, to which the CSI-RSs for the at least 2 antenna ports are mapped, via the transmitting module 3612.

The processor 3613 performs a function of operating information received by the user equipment device, information to be externally transmitted and the like. The memory 3614 may be able to store the operated information and the like for prescribed duration and may be substituted with such a component as a buffer (not shown in the drawing) and the like.

Meanwhile, a user equipment (UE) 3620 may include a receiving module 3621, a transmitting module 3622, a processor 3623 and a memory 3624. The receiving module 3621 may receive various signals, data, information and the like from a base station and the like. The transmitting module 3622 may transmit various signals, data, information and the like to the base station and the like. The processor 3623 may be configured to control overall operations of the user equipment 3620 including the receiving module 3621, the transmitting module 3622, the memory 3624 and an antenna 3625. And, the antenna 3625 may include a plurality of antennas.

The processor 3623 may control the user equipment 3620 to measure a channel from channel state information-reference signals (CSI-RSs) for at least two antenna ports. In particular, the processor 3623 may be configured to control the receiving module 3621 to receive a downlink subframe in which the CSI-RSs for the at least 2 antenna ports are mapped to a data region of the downlink subframe in accordance with a prescribed pattern. The processor 3623 may be configured to measure a channel for each antenna port using the CSI-RSs for the at least 2 antenna ports.

The processor 3623 performs a function of operating information received by the user equipment, information to be externally transmitted by the user equipment and the like. The memory 3624 may be able to store the operated information and the like for prescribed duration and may be substituted with such a component as a buffer (not shown in the drawing) and the like.

In the following description, items applicable in common to the base station 3610 configured to transmit CSI-RS and the user equipment 3620 configured to perform channel measurement from the CSI-RS are explained.

First of all, a prescribed pattern for mapping CSI-RS to a downlink subframe may be defined as a pattern different per cell. If the prescribed pattern is defined as the pattern different per cell, it may mean that CSI-RS is arranged in accordance with the prescribed pattern and that a position of CSI-RS in a different cell is V-shifted and/or T-shifted in the prescribed pattern. The prescribed pattern may define that the CSI-RS for one cell is arranged on some of OFDM symbols having a demodulation reference signal (DMRS) arranged thereon. Moreover, the prescribed pattern may be able to define that the CSI-RS for one cell is arranged on at least 2 OFDM symbols in one resource block.

A prescribed pattern for mapping CSI-RS to a downlink subframe may be defined as a pattern different in accordance with a type of the downlink subframe. If the prescribed pattern is defined as the pattern different in accordance with the downlink subframe type, it may mean that CSI-RS is arranged in accordance with a prescribed pattern in a prescribed type subframe and that a position of CSI-RS is V-shifted and/or T-shifted in a different type subframe. In this case, the type of the downlink subframe may be categorized into a downlink subframe having a normal cyclic prefix (CP) configuration and a downlink subframe having an extended cyclic prefix (CP) configuration. Alternatively, the type of the downlink subframe may be categorized into a special subframe including DwPTS (downlink pilot time slot) and a normal subframe not including DwPTS. In this case, if the downlink subframe is the special subframe including the DwPTS, the prescribed pattern of the CSI-RS may be able to define that the CSI-RS is arranged in a $1^{st}$ slot of the downlink subframe only.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description may be applicable to various kinds of mobile communication systems.

What is claimed is:

1. A method of transmitting channel state information-reference signals (CSI-RSs) for at least 2 antenna ports, the method comprising:
    mapping the CSI-RSs for the at least 2 antenna ports to a data region of a downlink subframe in accordance with a prescribed pattern; and
    transmitting the downlink subframe to which the CSI-RSs for the at least 2 antenna ports are mapped,
    wherein the prescribed pattern is defined as a pattern different in accordance with a type of the downlink subframe,
    wherein the different pattern is defined as a pattern shifted from the prescribed pattern in one of a frequency domain or both of a time domain and the frequency domain, and
    wherein if the downlink subframe is a special subframe including a downlink pilot time slot (DwPTS), the prescribed pattern defines that the CSI-RSs for the at least 2 antenna ports are arranged only in a first slot of the downlink subframe.

2. The method of claim 1, wherein the prescribed pattern defines that the CSI-RSs for one cell are arranged on a portion of orthogonal frequency division multiplexing (OFDM) symbols on which a demodulation reference signals (DMRSs) are arranged.

3. The method of claim 1, wherein the prescribed pattern defines that the CSI-RSs for one cell are arranged on 2 OFDM symbols in one resource block.

4. The method of claim 1, wherein a type of the downlink subframe is categorized into a downlink subframe having a normal cyclic prefix (CP) configuration and a downlink subframe having an extended cyclic prefix (CP) configuration.

5. The method of claim 1, wherein a type of the downlink subframe is categorized into the special subframe including the DwPTS and a normal subframe not including the DwPTS.

6. A method of measuring a channel from channel state information-reference signals (CSI-RSs) for at least 2 antenna ports, the method comprising:
receiving a downlink subframe in which the CSI-RSs for the at least 2 antenna ports are mapped to a data region of a downlink subframe in accordance with a prescribed pattern; and
measuring a channel for each of the antenna ports using the CSI-RSs for the at least 2 antenna ports,
wherein the prescribed pattern is defined as a pattern different in accordance with a type of the downlink subframe,
wherein the different pattern is defined as a pattern shifted from the prescribed pattern in one of a frequency domain or both of a time domain and the frequency domain, and
wherein if the downlink subframe is a special subframe including a downlink pilot time slot (DwPTS), the prescribed pattern defines that the CSI-RSs for the at least 2 antenna ports are arranged only in a first slot of the downlink subframe.

7. The method of claim 6, wherein the prescribed pattern defines that the CSI-RSs for one cell are arranged on a portion of orthogonal frequency division multiplexing (OFDM) symbols on which a demodulation reference signals (DMRSs) are arranged.

8. The method of claim 6, wherein the prescribed pattern defines that the CSI-RSs for one cell are arranged on 2 OFDM symbols in one resource block.

9. The method of claim 6, wherein a type of the downlink subframe is categorized into a downlink subframe having a normal cyclic prefix (CP) configuration and a downlink subframe having an extended cyclic prefix (CP) configuration.

10. The method of claim 6, wherein a type of the downlink subframe is categorized into the special subframe including the DwPTS and a normal subframe not including the DwPTS.

11. A base station for transmitting channel state information-reference signals (CSI-RSs) for at least 2 antenna ports, the base station comprising:
a receiving module receiving an uplink signal from a user equipment;
a transmitting module transmitting a downlink signal to the user equipment; and
a processor controlling the base station including the receiving module and the transmitting module,
wherein the processor is further configured to:
map the CSI-RSs for the at least 2 antenna ports to a data region of a downlink subframe in accordance with a prescribed pattern,
control the transmitting module to transmit the downlink subframe to which the CSI-RSs for the at least 2 antenna ports are mapped,
wherein the prescribed pattern is defined as a pattern different in accordance with a type of the downlink subframe,
wherein the different pattern is defined as a pattern shifted from the prescribed pattern in one of a frequency domain or both of a time domain and the frequency domain, and
wherein if the downlink subframe is a special subframe including a downlink pilot time slot (DwPTS), the prescribed pattern defines that the CSI-RSs for the at least 2 antenna ports are arranged only in a first slot of the downlink subframe.

12. A user equipment for measuring channel from channel state information-reference signals (CSI-RSs) for at least 2 antenna ports, the user equipment comprising:
a receiving module receiving a downlink signal from a base station;
a transmitting module transmitting an uplink signal to the base station; and
a processor controlling the user equipment including the receiving module and the transmitting module,
wherein the processor is further configured to:
control the receiving module to receive a downlink subframe in which the CSI-RSs for the at least 2 antenna ports are mapped to a data region of a downlink subframe in accordance with a prescribed pattern, and
measure a channel for each of the antenna ports using the CSI-RSs for the at least 2 antenna ports,
wherein the prescribed pattern is defined as a pattern different in accordance with a type of the downlink subframe,
wherein the different pattern is defined as a pattern shifted from the prescribed pattern in one of a frequency domain or both of a time domain and the frequency domain, and
wherein if the downlink subframe is a special subframe including a downlink pilot time slot (DwPTS), the prescribed pattern defines that the CSI-RSs for the at least 2 antenna ports are arranged only in a first slot of the downlink subframe.

* * * * *